United States Patent
Wei et al.

(10) Patent No.: US 12,482,843 B2
(45) Date of Patent: Nov. 25, 2025

(54) RECHARGEABLE ELECTROCHEMICAL DEVICES AND METHODS FOR THE SAME

(71) Applicant: UNM RAINFOREST INNOVATIONS, Albuquerque, NM (US)

(72) Inventors: Shuya Wei, Albuquerque, NM (US); Cameron Carugati, Albuquerque, NM (US); Christie Fetrow, Albuquerque, NM (US)

(*) Notice: Subject to any disclaimer, the term of this patent is extended or adjusted under 35 U.S.C. 154(b) by 0 days.

(21) Appl. No.: 18/655,565

(22) Filed: May 6, 2024

(65) Prior Publication Data
US 2024/0297324 A1    Sep. 5, 2024

Related U.S. Application Data

(63) Continuation of application No. PCT/US2023/025752, filed on Jun. 20, 2023.

(60) Provisional application No. 63/357,938, filed on Jul. 1, 2022.

(51) Int. Cl.
*H01M 8/18* (2006.01)
(52) U.S. Cl.
CPC .................. *H01M 8/188* (2013.01)
(58) Field of Classification Search
CPC ..................................... H01M 8/188
See application file for complete search history.

(56) References Cited

U.S. PATENT DOCUMENTS

| | | | |
|---|---|---|---|
| 2019/0006701 A1* | 1/2019 | Dai | H01M 4/38 |
| 2020/0095400 A1* | 3/2020 | Scherman | C08J 3/096 |
| 2020/0203675 A1* | 6/2020 | Lin | H01M 50/193 |
| 2020/0216967 A1* | 7/2020 | Archer | H01M 4/463 |
| 2021/0047743 A1* | 2/2021 | Goetheer | B01D 53/1425 |
| 2021/0066706 A1* | 3/2021 | Belcher | H01M 4/463 |
| 2021/0104772 A1* | 4/2021 | Alvare | H01G 11/60 |

FOREIGN PATENT DOCUMENTS

| | | |
|---|---|---|
| CN | 113097565 A | 7/2021 |
| KR | 10-2007-0021962 A | 2/2007 |
| WO | 2020056514 A1 | 3/2020 |
| WO | 2021080687 A2 | 4/2021 |

OTHER PUBLICATIONS

Wunderwald et al. "A Low-Cost Al-Graphite Battery with Urea and Acetamide-Based Electrolytes" ChemElectroChem 2021, 8, 1988-1992 (Year: 2021).*

(Continued)

*Primary Examiner* — Lisa S Park
(74) *Attorney, Agent, or Firm* — MH2 Technology Law Group LLP

(57) ABSTRACT

Rechargeable electrochemical devices and methods for the same are disclosed. The electrochemical devices may include an anode, a cathode, and an electrolyte disposed between the anode and the cathode. The electrolyte may include a deep eutectic mixture and an electrolyte additive. The deep eutectic mixture may include an ion coordinated complex prepared from a combination of aluminum chloride ($AlCl_3$) and an amide or a combination of $AlCl_3$ and an organic salt.

18 Claims, 15 Drawing Sheets

(56) References Cited

OTHER PUBLICATIONS

Heo, Joo Hyung. (Authorized officer), International Search Report and Written Opinion in corresponding International Application No. PCT/US2023/025752 mailed on Feb. 20, 2024, 11 pages.
Al Sadat, Wajdi I. et al. "The O2-assisted Al/CO2 electrochemical cell: A system for CO2 capture/conversion and electric power generation." Science Advances 2.7 (2016): e1600968.
Nakamura, Y. (Authorized officer), International Preliminary Report on Patentability in corresponding International Application No. PCT/US2023/025752 mailed on Jan. 16, 2025, 7 pages.

\* cited by examiner

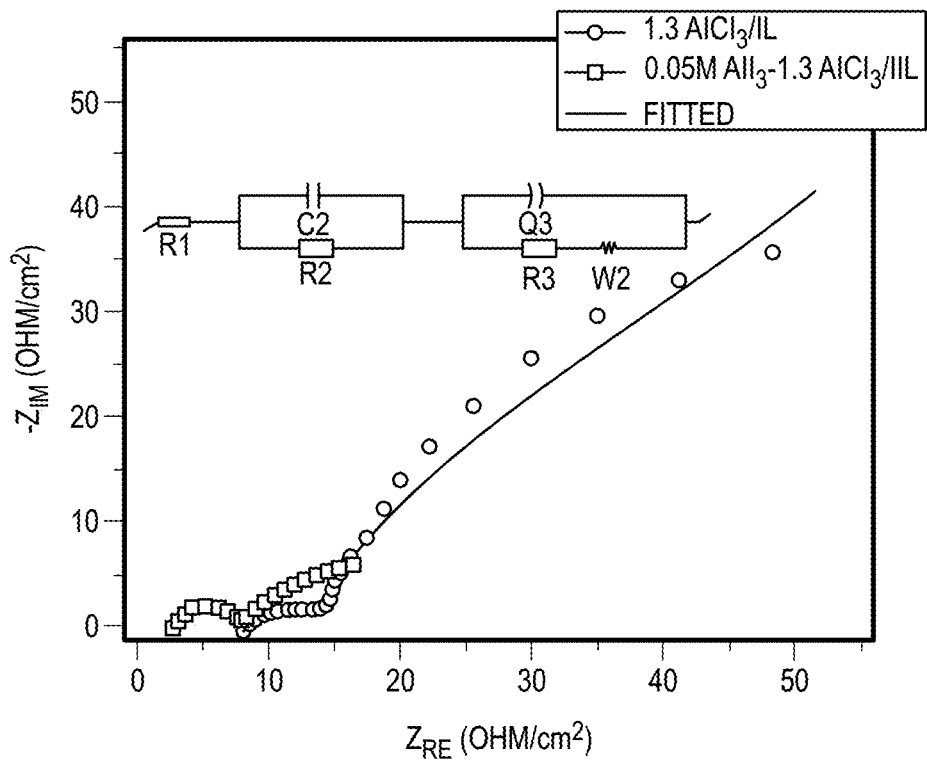
FIG. 3C
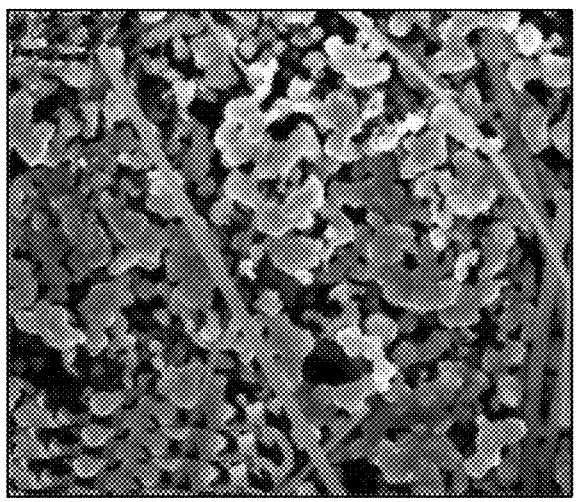 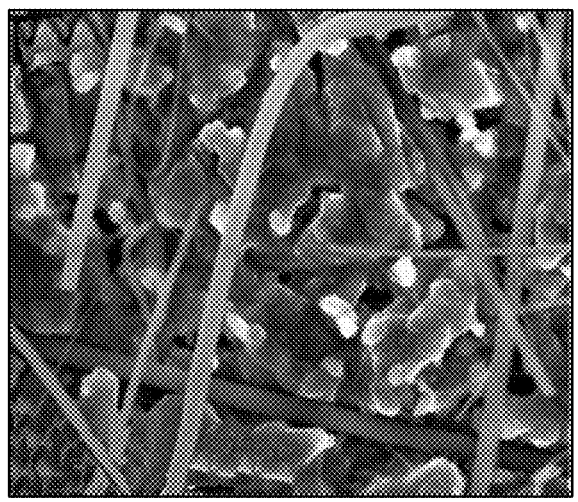
FIG. 3D FIG. 3E

RECHARGEABLE ELECTROCHEMICAL DEVICES AND METHODS FOR THE SAME

CROSS-REFERENCE TO RELATED APPLICATIONS

This application is a bypass continuation of PCT/US2023/025752 filed Jun. 20, 2023, which claims priority to U.S. Provisional Patent Application No. 63/357,938, filed on Jul. 1, 2022, the disclosures of which are incorporated by reference herein in their entireties.

STATEMENT REGARDING FEDERALLY SPONSORED RESEARCH OR DEVELOPMENT

This invention was made with government support under Grant No. 2119688 awarded by the National Science Foundation (NSF). The government may have certain rights in this invention.

BACKGROUND

Since the Industrial Revolution, the reliance on fossil fuels for energy has led to a substantial increase in carbon dioxide ($CO_2$) levels in the atmosphere, resulting in abnormal and extreme climate changes. In 2018, energy-related $CO_2$ emissions reached a historic high of 33.1 gigatons (Gt) $CO_2$, and more recently, atmospheric $CO_2$ levels exceeded 415 parts per million (ppm) for the first time in human history. Developing reliable technologies that incorporate carbon capture, utilization, and sequestration while maintaining the high energy density of fossil fuels has become an urgent and challenging necessity in our time.

Considerable efforts have been devoted to carbon capture technologies using aqueous amine-based solutions and $CO_2$ reduction technologies to convert $CO_2$ into fuels or chemicals through chemical, photochemical, or electrochemical processes. These post-combustion carbon capture and conversion technologies, however, require substantial energy inputs. For example, electrochemically converting $CO_2$ to methane ($CH_4$) using copper (Cu) catalysts in aqueous solutions demands high overpotentials exceeding 1 volt (V) and yields of only about 20%. Even the simplest conversion product CO, via two-electron transfer, can only be formed at overpotentials of 0.5 V-1 V with acceptable Faradaic efficiencies less than 50% with competing $H_2$ by-product evolution co-occurring during the process. The difficulty in converting $CO_2$ to useful fuels and chemicals arises from the high thermodynamic and kinetic stability of $CO_2$, making it a challenging task for researchers and scientists. As a result, the development of low-energy carbon capture and conversion technologies remains a top priority in mitigating global climate change.

What is needed, then, are improved rechargeable electrochemical devices capable of improved carbon dioxide capture and conversion, energy storage, and energy generation.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing an electrochemical device including an anode, a cathode, and an electrolyte disposed between the anode and the cathode, the electrolyte include a deep eutectic mixture and an electrolyte additive. The deep eutectic mixture may include an ion coordinated complex prepared from a combination of aluminum chloride ($AlCl_3$) and an amide or a combination of $AlCl_3$ and an organic salt.

In at least one implementation, the ion coordinated complex may be prepared from the combination of $AlCl_3$ and the amide. The amide may include one or more of thiourea, urea, formamide, dimethylformamide, acetamide, dimethylacetamide, or a combination thereof. Optionally, the amide may be selected from the group consisting of thiourea, urea, formamide, dimethylformamide, acetamide, dimethylacetamide, and combinations thereof In at least one implementation, the ion coordinated complex may be prepared from the combination of $AlCl_3$ and the amide. The amide may be selected from the group consisting of urea, acetamide, and combinations thereof.

In at least one implementation, the ion coordinated complex may be prepared from the combination of $AlCl_3$ and the amide. The aluminum chloride and the amide may be present in a molar ratio of from about 1:1 to about 1.5:1

In at least one implementation, the electrolyte may further include an organic solvent configured to reduce a viscosity of the electrolyte. The volume ratio of the deep eutectic mixture to the organic solvent may be from about 1:4 to about 4:1.

In at least one implementation, the organic solvent may include one or more of acetonitrile, dichloromethane, chloroform, tetraethyl dimethyl ether, propylene carbonate, ethylene carbonate, fluoroethylene carbonate, or a combination thereof.

In at least one implementation, the ion coordinated complex may be prepared from the combination of $AlCl_3$ and the organic salt.

In at least one implementation, the organic salt may include one or more of 1-ethyl-3-methylimidazolium chloride, 1-ethyl-3-methylimidazolium iodide, ethylpyridinium chloride, ethylpyridinium bromide, butylpyridinium chloride, or a combination thereof.

In at least one implementation, the electrolyte additive may include one or more of iodine, an iodine salt, an iodide salt, an organic iodide species, an organic radical, or a combination thereof.

In at least one implementation, the iodide salt may include one or more of a quaternary ammonium iodide, a metal iodide, or a combination thereof.

In at least one implementation, the metal iodide may include aluminum iodide ($AlI_3$).

In at least one implementation, the electrolyte additive may be present in the electrolyte in an amount of from about 0.01 M to about 0.1 M.

In at least one implementation, the electrochemical cell may further include a housing, wherein the anode, the cathode, and the electrolyte are disposed in the housing.

In at least one implementation, the housing may include one or more ports configured to provide inlet and outlet of a gas.

In at least one implementation, the one or more ports may include an electrolyte entry port and an electrolyte exit port.

In at least one implementation, the electrochemical cell may further include an electrolyte reservoir fluidly coupled with the electrolyte entry port and/or the electrolyte exit port.

In at least one implementation, the cathode may include a carbon material. The anode may include a metal.

In at least one implementation, the metal may include one or more of sodium, magnesium, aluminum, zinc, calcium, copper, iron, or a combination thereof.

In at least one implementation, the carbon material may include one or more of graphene, graphite, carbon black, carbon fibers, carbon microfibers, carbon nanomaterials, carbon nanotubes, multi-walled carbon nanotubes, single walled carbon nanotubes, biotemplated carbon materials, molecular templated multi-walled carbon nanotubes, biotemplated single walled carbon nanotubes, or a combination thereof.

In at least one implementation, the cathode may be in direct contact with the environment and configured to allow diffusion of carbon dioxide to the electrolyte.

In at least one implementation, the carbon material may be porous and configured to allow diffusion of carbon dioxide to the electrolyte.

In at least one implementation, the electrochemical device may include a capacity of greater than 9600 mAh/$g_{carbon}$, an energy density of greater than 7700 mWh/$g_{carbon}$, or a combination thereof.

In at least one implementation, the electrochemical device may include an energy efficiency of greater than 80%.

The foregoing and/or other aspects and utilities embodied in the present disclosure may be achieved by providing a method for sequestering carbon dioxide with any one or more of the electrochemical devices disclosed herein. The method may include discharging the electrochemical device in the presence of carbon dioxide. The method may also include converting the carbon dioxide to a reduced carbon dioxide material.

The foregoing and/or other aspects and utilities embodied in the present disclosure may be achieved by providing a method for capturing carbon dioxide with any one or more of the electrochemical devices disclosed herein. The method may include discharging the electrochemical device in the presence of carbon dioxide; directing aluminum to the electrolyte; flowing the electrolyte to and through the electrochemical device via an electrolyte entry port; converting the carbon dioxide to a reduced carbon dioxide material; directing the reduced carbon dioxide material out of the electrochemical device; or a combination thereof.

Further areas of applicability of the present disclosure will become apparent from the detailed description provided hereinafter. It should be understood that the detailed description and specific examples, while indicating some typical aspects of the disclosure, are intended for purposes of illustration only and are not intended to limit the scope of the disclosure.

BRIEF DESCRIPTION OF THE DRAWINGS

The accompanying drawings, which are incorporated in and constitute a part of this specification, illustrate varying implementations of the present disclosure. These and/or other aspects and advantages in the implementations of the disclosure will become apparent and more readily appreciated from the following description of the various implementations, taken in conjunction with the accompanying drawings. It should be noted that some details of the drawings have been simplified and are drawn to facilitate understanding of the present disclosure rather than to maintain strict structural accuracy, detail, and scale. These drawings/figures are intended to be explanatory and not restrictive.

FIG. 3C illustrates electrochemical impedance spectroscopy of symmetric Al/Al cells with and without $AlI_3$ after about 100 hours (h) of stripping/plating at a current rate of about 0.2 mA/$cm^2$.

FIG. 3D illustrates scanning electron microscopy (SEM) images of aluminum anodes from Al/Al cells without $AlI_3$ additive after about 1000 h of stripping/plating at a current rate of 0.2 mA/$cm^2$.

FIG. 3E illustrates scanning electron microscopy (SEM) images of aluminum anodes from Al/Al cells with $AlI_3$ additive after about 1000 h of stripping/plating at a current rate of 0.2 mA/$cm^2$.

DETAILED DESCRIPTION

Figure 1A:
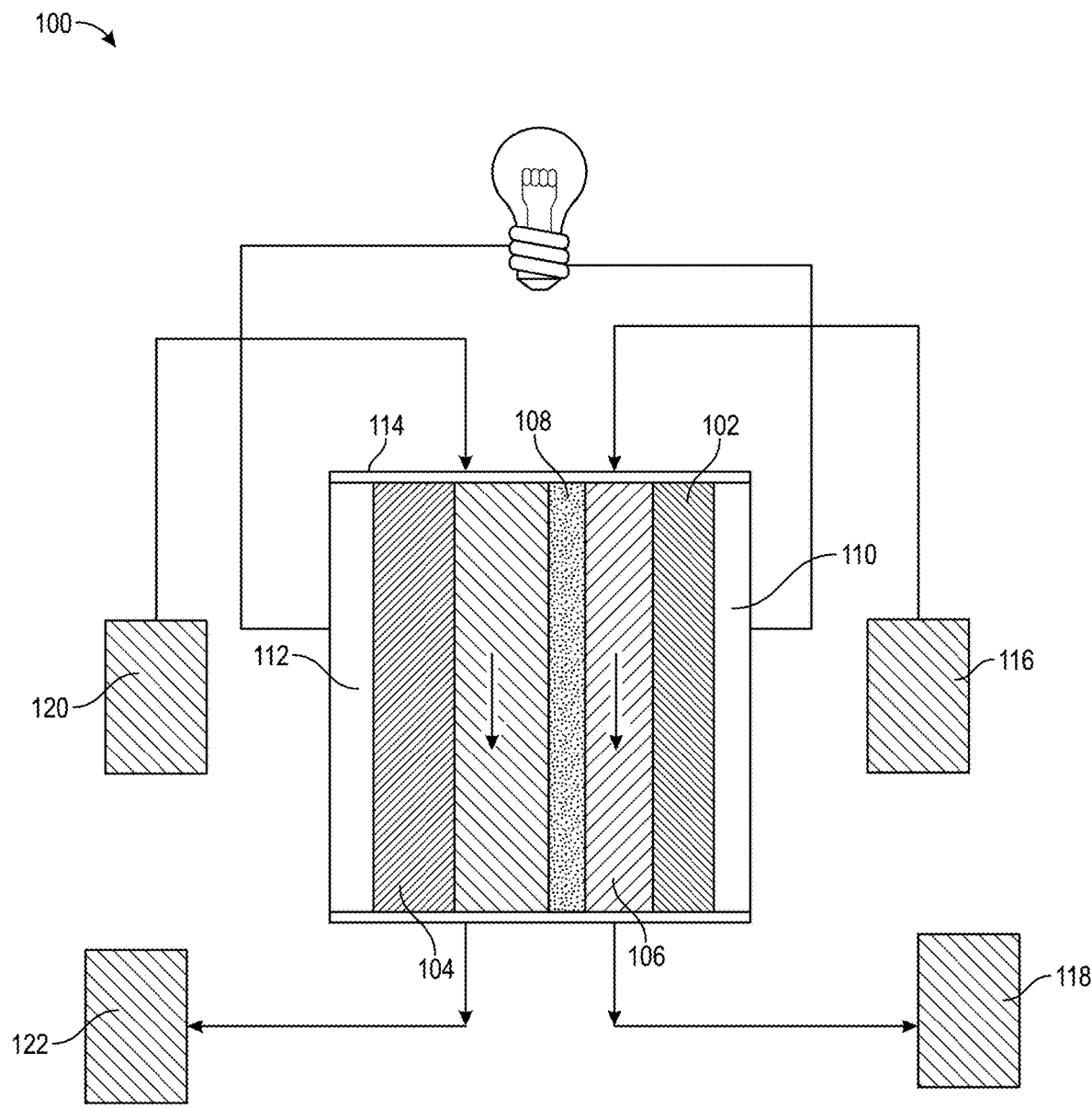
FIG. 1A illustrates a schematic view of an exemplary electrochemical cell, according to one or more implementations disclosed.

The following description of various typical aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any embodiments or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, "free" or "substantially free" of a material may refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

All references cited herein are hereby incorporated by reference in their entireties. In the event of a conflict in a definition in the present disclosure and that of a cited reference, the present disclosure controls.

The present inventors have surprisingly and unexpectedly discovered that utilizing an exemplary electrolyte comprising a deep eutectic mixture and an electrolyte additive, such as aluminum iodide ($AlI_3$), as a homogenous redox mediator or additive in an electrolyte of an Al—$CO_2$ electrochemical cell resulted in a significant, surprising, and unexpected capability in reducing the overpotential in the Al—$CO_2$ electrochemical cell. The present inventors have also demonstrated that the introduction of $AlI_3$ to the electrolyte clearly enables the discharge of the Al—$CO_2$ electrochemical cells as a replacement for $O_2$ in conventional Al—$CO_2$/$O_2$ electrochemical cells. However, unlike conventional Al—$CO_2$/$O_2$ electrochemical cells, the introduction of $AlI_3$ in the exemplary electrolyte successfully enables a reversible Al—$CO_2$ electrochemical cell with relatively low or ultralow overpotentials across a range of current densities while maintaining both a high discharge voltage and a high capacity.

The present inventors have surprisingly and unexpectedly discovered that utilizing an electrolyte comprising a deep eutectic mixture of urea or acetamide and aluminum chloride, with an electrolyte additive, such as aluminum iodide, resulted in a significant and unexpected capability in efficiently stripping/plating aluminum metal.

Electrochemical cells or batteries are disclosed herein. The electrochemical cells or batteries disclosed herein may be rechargeable. FIG. 1A illustrates a schematic view of an exemplary electrochemical cell 100, according to one or more implementations. The electrochemical cell 100 may be a secondary Al—$CO_2$ electrochemical cell. The electrochemical cell may include one or more of an anode 102, a cathode 104, an electrolyte 106, a separator 108, an anode collector 110, a cathode collector 112, or a combination thereof. For example, as illustrated in FIG. 1A, the electrochemical cell 100 may include an anode 102, a cathode 104, and an electrolyte 106 disposed between the anode 102 and the cathode 104. In at least one example, the electrochemical cell 100 may include a separator 108 disposed between the anode 102 and cathode 104. In at least one example, the electrochemical cell 100 may include an anode collector 110 disposed adjacent the anode 102. In at least one example, the electrochemical cell 100 may include a cathode collector 112 disposed adjacent the cathode 104. In at least one implementation, the electrolyte 106 of the electrochemical cell 100 may be in contact with the cathode 104 and the anode 102. The anode 102 and the cathode 104 may be operably and/or electrically connected or coupled with one another, and the electrical connection may include a power source (when the desired electrochemical reaction requires electrical energy) and/or an electrical load (when the electrochemical reaction produces electrical energy).

In at least one implementation, illustrated in FIG. 1A, the electrochemical cell 100 may include a housing 114 configured to contain the anode 102, the cathode 104, the electrolyte 106, the separator 108, the anode collector 110, the cathode collector 112, or a combination thereof. The housing 114 may include one or more ports capable of or configured to provide an inlet and/or outlet for fluids, such as gases. For example, the housing 114 may include an anode gas entry port, an anode gas exit port, an electrolyte entry port, an electrolyte exit port, an entry and/or exit port in fluid communication with one or more gas reservoirs, or a combination thereof.

In at least one implementation, the electrochemical cell 100 may include one or more electrolyte reservoirs (two are shown 116, 118) capable of or configured to store, receive, and/or deliver the electrolyte. For example, as illustrated in FIG. 1A, the electrochemical cell 100 may include a first electrolyte reservoir 116 fluidly coupled with the electrolyte 106 of the electrochemical cell 100 and configured to deliver the electrolyte thereto. As further illustrated in FIG. 1A, the electrochemical cell 100 may further include a second electrolyte reservoir 118 fluidly coupled with the electrolyte 106 the electrochemical cell 100 and configured to receive and store the electrolyte therefrom. It should be appreciated that the electrochemical cell 100 may include a single electrolyte reservoir operably and/or fluidly coupled with the electrolyte 106 of the electrochemical cell 100. In at least one implementation, the electrochemical cell 100 may include one or more pumps (not shown) capable of or configured to direct the electrolyte between the one or more electrolyte reservoirs 116, 118 and the electrolyte 106 of the electrochemical cell 100.

In at least one implementation, the electrolyte 106 may be or include a deep eutectic mixture. As used herein, the term or expression "deep eutectic mixture" may refer to a mixture of two or more molecules which in combination obtain a melting point below the melting point of the individual components. For example, typical eutectic mixtures may have a melting point of greater than or equal to 65° C., greater than or equal to 70° C., greater than or equal to 80° C., greater than or equal to 90° C., greater than or equal to 100° C., or more. A deep eutectic mixture may have a melting point of at room temperature (about 20° C.), about 25° C., about 30° C., about 35° C., or less. For example, a deep eutectic mixture may have a melting point from about 20° C. to about 25° C., about 20° C. to about 30° C., or about 20° C. to about 35° C. The deep eutectic mixture may include an ion coordinated complex prepared from a combination of aluminum chloride ($AlCl_3$) and an organic molecule. In at least one implementation, the organic molecule may be or include an amide. For example, the organic molecule includes one or more of a thiourea, urea, formamide, dimethylformamide, acetamide, dimethylacetamide, or a combination thereof. In an exemplary implementation, the organic molecule may include one or more of a urea, an acetamide, or a combination thereof. In another implementation, the deep eutectic mixture may include an ion coordinated complex prepared from a combination of aluminum chloride ($AlCl_3$) and an organic salt. Illustrative organic salts may be or include, but are not limited to, organic halides, such as alkylpyridinium halides and dialkylimidazolium halides. Illustrative organic halides may be or include, but are not limited to, 1-ethyl-3-methylimidazolium chloride, 1-ethyl-3-methylimidazolium iodide, ethylpyridinium chloride, ethylpyridinium bromide, butylpyridinium chloride, or the like, or a combination thereof.

In at least one implementation, the deep eutectic mixture may include the aluminum chloride ($AlCl_3$) and the organic molecule, such as the amide, in a molar ratio of from about 1:1 (about 1 to about 1) to about 1.5:1 (about 1.5 to about 1). For example, the deep eutectic mixture may include the aluminum chloride ($AlCl_3$) and the organic molecule in a molar ratio of about 1:1, about 1.1:1, about 1.2:1, about 1.3:1, about 1.4:1, or about 1.5:1. In another example, the deep eutectic mixture may include the aluminum chloride ($AlCl_3$) and the organic molecule in a molar ratio of from about 1:1 to about 1.5:1 or about 1.2:1 to about 1.4:1.

In at least one implementation, the electrolyte may include an organic solvent capable of or configured to reduce the viscosity of the electrolyte. Illustrative organic solvents may be or include, but are not limited to, one or more of acetonitrile, dichloromethane, chloroform, tetraethyl dimethyl ether, propylene carbonate, ethylene carbonate, fluoroethylene carbonate, or a combination thereof. The deep eutectic mixture and the organic solvent may be present in a volume ratio from about 1:4 to about 4:1. For example, the deep eutectic mixture and the organic solvent may be in a volume ratio of about 1:4, about 1:3, about 1:2, about 1:1, about 2:1, about 3:1, or about 4:1. In another example, the deep eutectic mixture and the organic solvent may be in a volume ratio of from about 1:4 to about 4:1, about 1:2 to about 4:1, or about 3:1.

In at least one implementation, the electrolyte may include a combination of the deep eutectic mixture and an electrolyte additive. The electrolyte additive may include one or more of iodine, an iodine salt, an iodide salt, an organic iodide species, an organic radical, or a combination thereof. Illustrative iodine salts may be or include, but are not limited to, iodine monochloride. Illustrative iodide salts may be or include, but are not limited to, a quaternary ammonium iodide, a metal iodide, or a combination thereof. Illustrative iodide salts may be or include, but are not limited to, aluminum iodide, triethylammonium iodide, 1-ethyl-3-methylimidazolium iodide, butylpyridinium iodide, triethylammonium triiodide, sodium iodide, iodine monochloride, or the like, or a combination thereof. Illustrative metal iodides may be or include, but are not limited to, aluminum iodide ($AlI_3$). Illustrative organic iodides may be or include, but are not limited to, triethylammonium triiodide, triethylammonium iodide, 1-ethyl-3-methylimidazolium iodide, butylpyridinium iodide, or the like, or a combination thereof. Illustrative organic radicals may be or include, but are not limited to, tetrabutylammonium iodide, tetrabutylammonium perchlorate, tetraethylammonium chloride, ethyl iodide, benzonitrile, or the like, or a combination thereof. In an exemplary implementation, the electrolyte additive is aluminum iodide ($AlI_3$). In at least one implementation, wherein the deep eutectic mixture includes an ion coordinated complex prepared from aluminum chloride ($AlCl_3$) and an amide, the electrolyte additive may not be limited to aluminum iodide ($AlI_3$).

The electrolyte additive may be present in an amount of from about 0.01 M to about 0.1 M, based on the total volume of the electrolyte. For example, the electrolyte additive may be present in an amount of about 0.01 M, about 0.02 M, about 0.03 M, about 0.04 M, about 0.05 M, about 0.06 M, about 0.07 M, about 0.08 M, about 0.1 M, based on the total volume of the electrolyte. In another example, the electrolyte additive may be present in the electrolyte in an amount of from about 0.01 M to about 0.1 M, about 0.02 M to about 0.09 M, about 0.04 M to about 0.07 M, or about 0.05 to about 0.06 M.

In at least one implementation, the electrochemical cell 100 may include one or more gas reservoirs or vessels 120, 122 capable of or configured to store, receive, and/or deliver a fluid, such as a source of carbon dioxide. For example, as illustrated in FIG. 1A, the electrochemical cell 100 may include a first gas reservoir 120 operably and/or fluidly coupled with the cathode 104 and configured to store and deliver a fluid, such as carbon dioxide, to the cathode 104. The electrochemical cell 100 may also include a second gas reservoir 122 operably and/or fluidly coupled with the cathode 104 and configured to receive and store a fluid, such as carbon monoxide (CO), from the cathode 104. In another implementation, the cathode 104 may be exposed to air or the environment, and capable of or configured to allow diffusion of air or carbon dioxide to the electrolyte 106. For example, as further discussed below, the cathode may be porous.

The cathode may be or include a carbon material, such as a conductive carbon material. Illustrative cathodes may be or include, but are not limited to, one or more of graphene, graphite, carbon black, carbon fibers, carbon microfibers, carbon nanomaterials, carbon nanotubes, multi-walled carbon nanotubes, single walled carbon nanotubes, biotemplated carbon materials, molecular templated multi-walled carbon nanotubes, biotemplated single walled carbon nanotubes, or a combination thereof. The carbon material may be porous, and capable of or configured to allow the diffusion of carbon dioxide to the electrolyte.

The anode may be or include a metal. Illustrative metals may be or include, but are not limited to, one or more of sodium, magnesium, aluminum, zinc, calcium, copper, iron, or a combination thereof. In an exemplary implementation, the anode includes aluminum.

Figure 1B:
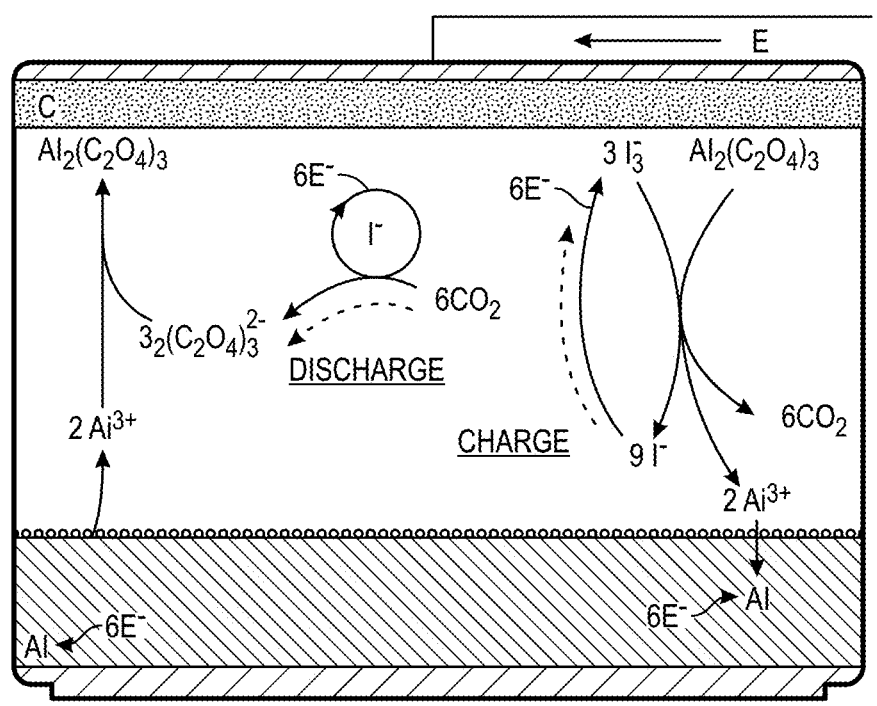
FIG. 1B illustrates a proposed mechanism for the secondary Al—$CO_2$ electrochemical cell of FIG. 1A, according to one or more implementations disclosed.

FIG. 1B illustrates a proposed mechanism for the secondary Al—CO$_2$ electrochemical cell of FIG. 1A, according to one or more implementations disclosed. The proposed mechanism may be represented by equations (1)-(7) below:

$$2Al \xrightarrow{E_{cell}} 2Al^{3+} + 6e^- \quad (1)$$

$$6CO_2 + 6e^- \xrightarrow{I^-} 6CO_2^- \quad (2)$$

$$6CO_2^- \rightarrow 3C_2O_4^{2-} \quad (3)$$

$$2Al^{3+} + 3C_2O_4^{2-} \rightarrow Al_2(C_2O_4)_3 \quad (4)$$

$$6I^- \xrightarrow{E_{cell}} 3I_2 + 6e^- \quad (5)$$

$$3I_2 + Al_2(C_2O_4)_3 \xrightarrow{I_2} 2Al^{3+} + 6CO_2 + 6I^- \quad (6)$$

$$2Al^{3+} + 6e^- \rightarrow 2Al \quad (7)$$

Equations (1)-(4) represent the discharge or discharge mechanism of the electrochemical cell and equations (5)-(7) represent the charge of the electrochemical cell. It should be appreciated, as further detailed below, that the iodide mediated reduction of CO$_2$ to CO$_2^-$ during the discharge mechanism is both surprising and unexpected. It should further be appreciated, as further detailed below, that the iodine-mediated decomposition of aluminum oxalate during the charge mechanism is both surprising and unexpected.

The electrochemical devices disclosed herein may include a capacity, with respect to the cathode, of greater than 9,600 mAh/g$_{carbon}$, an energy density of greater than 7,700 mWh/g$_{carbon}$, or a combination thereof. For example, the electrochemical devices disclosed herein may include a capacity, with respect to the cathode, of greater than 9,600 mAh/g$_{carbon}$, 9,800 mAh/g$_{carbon}$, 10,000 mAh/g$_{carbon}$, or more. In another example, the electrochemical devices disclosed herein may include an energy density of greater than 7,700 mWh/g$_{carbon}$, greater than 7,900 mWh/g$_{carbon}$, greater than 8,100 mWh/g$_{carbon}$, or more. The anode provides a capacity of about 2,980 mAh/g or greater. The electrochemical cell may have a total energy of 900 Wh/kg or greater, 950 Wh/kg or greater, 993 Wh/kg or greater, or more.

The electrochemical devices disclosed herein may have an energy efficiency of greater than 80%, greater than 85%, greater than 90%, greater than 95%, or more.

The present disclosure provides methods for sequestering carbon dioxide with any one of the electrochemical devices disclosed herein. The method may include applying a voltage across the anode and the cathode of the electrochemical device. The method may also include discharging the electrochemical device in the presence of carbon dioxide. The method may further include converting the carbon dioxide to a reduced carbon dioxide material.

The present disclosure also provides methods for capturing carbon dioxide with the electrochemical device disclosed herein. The method may include one or more of discharging the electrochemical device in the presence of carbon dioxide, directing aluminum to the electrolyte; flowing the electrolyte to and through the electrochemical device via an electrolyte entry port; converting the carbon dioxide to a reduced carbon dioxide material; directing the reduced carbon dioxide material out of the electrochemical device, or a combination thereof.

The following numbered paragraphs disclose one or more exemplary variations of the subject matter of the application:

1. An electrochemical device, comprising: an anode; a cathode; and an electrolyte disposed between the anode and the cathode, the electrolyte comprising a deep eutectic mixture and an electrolyte additive, wherein the deep eutectic mixture comprises an ion coordinated complex prepared from a combination of aluminum chloride (AlCl$_3$) and an amide or a combination of AlCl$_3$ and an organic salt.

2. The electrochemical device of paragraph 1, wherein the ion coordinated complex is prepared from the combination of AlCl$_3$ and the amide, and wherein the amide comprises one or more of thiourea, urea, formamide, dimethylformamide, acetamide, dimethylacetamide, or a combination thereof, optionally, the amide is selected from the group consisting of thiourea, urea, formamide, dimethylformamide, acetamide, dimethylacetamide, and combinations thereof.

3. The electrochemical device of any one of paragraphs 1 and 2, wherein the ion coordinated complex is prepared from the combination of AlCl$_3$ and the amide, and wherein the amide is selected from the group consisting of urea, acetamide, and combinations thereof.

4. The electrochemical device of any one of the paragraphs 1-3, wherein the ion coordinated complex is prepared from the combination of AlCl$_3$ and the amide, and wherein the aluminum chloride and the amide are present in a molar ratio of from about 1:1 to about 1.5:1.

5. The electrochemical device of any one of paragraphs 1-4, wherein the electrolyte further comprises an organic solvent configured to reduce a viscosity of the electrolyte, wherein the a volume ratio of the deep eutectic mixture to the organic solvent is from about 1:4 to about 4:1.

6. The electrochemical device of paragraph 5, wherein the organic solvent comprises one or more of acetonitrile, dichloromethane, chloroform, tetraethyl dimethyl ether, propylene carbonate, ethylene carbonate, fluoroethylene carbonate, or a combination thereof.

7. The electrochemical device of paragraph 1, wherein the ion coordinated complex is prepared from the combination of $AlCl_3$ and the organic salt.

8. The electrochemical device of paragraph 7, wherein the organic salt comprises one or more of 1-ethyl-3-methylimidazolium chloride, 1-ethyl-3-methylimidazolium iodide, ethylpyridinium chloride, ethylpyridinium bromide, butylpyridinium chloride, or a combination thereof.

9. The electrochemical device of any one of paragraphs 1-8, wherein the electrolyte additive comprises one or more of iodine, an iodine salt, an iodide salt, an organic iodide species, an organic radical, or a combination thereof.

10. The electrochemical device of paragraph 9, wherein the iodide salt comprises one or more of a quaternary ammonium iodide, a metal iodide, or a combination thereof.

11. The electrochemical device of paragraph 10, wherein the metal iodide comprises aluminum iodide ($AlI_3$).

12. The electrochemical device of any one of paragraphs 1-11, wherein the electrolyte additive is present in the electrolyte in an amount of from about 0.01 M to about 0.1 M.

13. The electrochemical device of any one of paragraphs 1-12, further comprising a housing, wherein the anode, the cathode, and the electrolyte are disposed in the housing.

14. The electrochemical device of paragraph 13, wherein the housing comprises one or more ports configured to provide inlet and outlet of a gas.

15. The electrochemical device of paragraph 14, wherein the one or more ports comprise an electrolyte entry port and an electrolyte exit port.

16. The electrochemical device of paragraph 15, further comprising an electrolyte reservoir fluidly coupled with the electrolyte entry port and/or the electrolyte exit port.

17. The electrochemical device of any one of paragraphs 1-16, wherein the cathode comprises a carbon material, and wherein the anode comprises a metal.

18. The electrochemical device of paragraph 17, wherein the metal comprises one or more of sodium, magnesium, aluminum, zinc, calcium, copper, iron, or a combination thereof.

19. The electrochemical device of any one of paragraphs 17 and 18, wherein the carbon material comprises one or more of graphene, graphite, carbon black, carbon fibers, carbon microfibers, carbon nanomaterials, carbon nanotubes, multi-walled carbon nanotubes, single walled carbon nanotubes, biotemplated carbon materials, molecular templated multi-walled carbon nanotubes, biotemplated single walled carbon nanotubes, or a combination thereof.

20. The electrochemical device of any one of paragraphs 1-19, wherein the cathode is in direct contact with the environment and configured to allow diffusion of carbon dioxide to the electrolyte.

21. The electrochemical device of any one of paragraphs 17 to 20, wherein the carbon material is porous and configured to allow diffusion of carbon dioxide to the electrolyte.

22. The electrochemical device of any one of paragraphs 1-21, wherein the electrochemical device comprises a capacity of greater than 9600 $mAh/g_{carbon}$, an energy density of greater than 7700 $mWh/g_{carbon}$, or a combination thereof.

23. The electrochemical device of any one of paragraphs 1-22, wherein the electrochemical device comprises an energy efficiency of greater than 80%.

24. A method for sequestering carbon dioxide with the electrochemical device of any one of paragraphs 1-23, the method comprising: discharging the electrochemical device in the presence of carbon dioxide; and converting the carbon dioxide to a reduced carbon dioxide material.

25. A method for capturing carbon dioxide with the electrochemical device of any one of paragraphs 1 to 23, the method comprising: discharging the electrochemical device in the presence of carbon dioxide; directing aluminum to the electrolyte; flowing the electrolyte to and through the electrochemical device via an electrolyte entry port; converting the carbon dioxide to a reduced carbon dioxide material; and directing the reduced carbon dioxide material out of the electrochemical device.

EXAMPLES

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

Example 1

Exemplary and comparative electrochemical cells or batteries were fabricated to evaluate the effects of $AlI_3$ as a redox mediator. To demonstrate the effects of the $AlI_3$ redox mediator, electrochemical cells were operated with and without the $AlI_3$ additive and were discharged with and without $CO_2$.

The electrochemical cells were fabricated according to the procedures disclosed by Sadat et al. (Al Sadat, W. I.; Archer, L. A., The O2-assisted Al/CO2 electrochemical cell: A system for CO2 capture/conversion and electric power generation. Science Advances 2016, 2 (7), e1600968.), the contents of which are incorporated herein to the extent consistent with the present disclosure. The Al—$CO_2$ electrochemical cells fabricated generally had the architecture/configuration of the electrochemical cell of FIG. 1. To fabricate the electrochemical cells, respective anodes were prepared by abrading aluminum metal (Millipore Sigma, 0.25 mm thickness, 99.999%) for about 5 minutes on each side to remove the oxide layer, and then rinsing the respective anodes with acetonitrile. All handling of the anode was conducted in an argon-filled glove box with $O_2$ and HO below 1.0 ppm. Respective separators were cut from 934-AH glass fiber (Whatman). Respective cathodes were fabricated by casting a ketjen black slurry on carbon paper (Fuel Cell Store, Toray carbon paper 030 5% wet proofed). The ketjen black slurry was composed of about 80% carbon and about 20% polyvinylidene fluoride (PVDF) binder by weight, before being mixed with N-methyl-N-pyrrolidone (NMP) (Spectrum Chemical, anhydrous) at a ratio of about 3:25. The PVDF was preemptively dissolved in NMP at about 5% weight ratio, leading to a final mixture ratio of about 1 g C:5 g PVDF solution: 50 ml NMP. The slurry was ball milled (about 300 rpm, about 150 minutes) and then cast on carbon paper at about 10 μM thickness before being vacuum baked (about 100° C., about 8 hours). The cathode carbon loading was about 1 mg. No cathode with a loading under 0.5 mg was used for any test.

The electrolyte for the electrochemical cells was prepared by combining $AlCl_3$ (Millipore Sigma, 99.999%) and 1-ethyl-3-methylimidazolium chloride (Aldrich, dry >98%)

in a molar ratio of about 1.3:1. The $AlCl_3$ was used as received, while the 1-ethyl-3-methylimidazolium chloride (IL) was vacuum dried (about 80° C., about 8 hours) before using. The electrolyte was stirred for about 8 hours before the large piece of aluminum (oxide layer removed as discussed above) being added to react with impurities. The aluminum was aged in the liquid for about 10 days or more. During aging, the liquid was clear to off-yellow and the aluminum blackened. The liquid was considered pure or substantially without impurities when a new piece of aluminum was added without significant blackening after about three days. After purifying or removing the impurities from the liquid, aluminum iodide was added to the electrolytes. All handling of the electrolyte was performed in an argon-filled glove box with $O_2$ and $H_2O$ below 1.0 ppm.

$CO_2$-containing electrochemical cells and their controls were fabricated in custom-made battery holders, which were designed to allow modulation or control of gas flow over the battery. The schematic is shown in FIG. 1. To fabricate the electrochemical cell or battery, the anode, separator, about 100 μl of the electrolyte, nickel foam inset, if used (MTI Corporation, 99.99%), cathode, and steel mesh spacer (Mc-Master-Carr, 316 stainless steel cloth mesh discs, ½" diameter, 100×100 mesh size) were added to the battery chamber. The battery chamber was then sealed and removed from the glove box. To add $CO_2$, the input line was first loosely attached to the $CO_2$ gas source, and $CO_2$ was flowed over the closed inlet valve at about 10-12 mL/min for about 5 minutes. The inlet and outlet valves were then opened, and $CO_2$ was flowed through the battery for about 30 minutes.

Cells for stripping/plating tests and linear sweep voltammetry were fabricated in 316 stainless-steel coin cell containers. The higher corrosion resistance stainless-steel was required due to the use of corrosive electrolyte, which was observed to oxidize even the 316 stainless-steel to a small degree when in contact with air. Stripping/plating tests were conducted with symmetric coin cells, while linear sweep voltammetry tests were performed with coin cells containing an aluminum anode against a stainless-steel cathode (a spacer).

Electrochemical testing was performed on a Biologic VSP Potentiostat operated with EC-Lab v11.30 software. The galvanostatic discharge and stripping/plating tests were performed on a Neware Battery Testing System using BTS v8 software. Batteries were allowed to rest for 1 hour disconnected from all equipment after $CO_2$ filling to allow the OCV to stabilize.

Figure 2A:
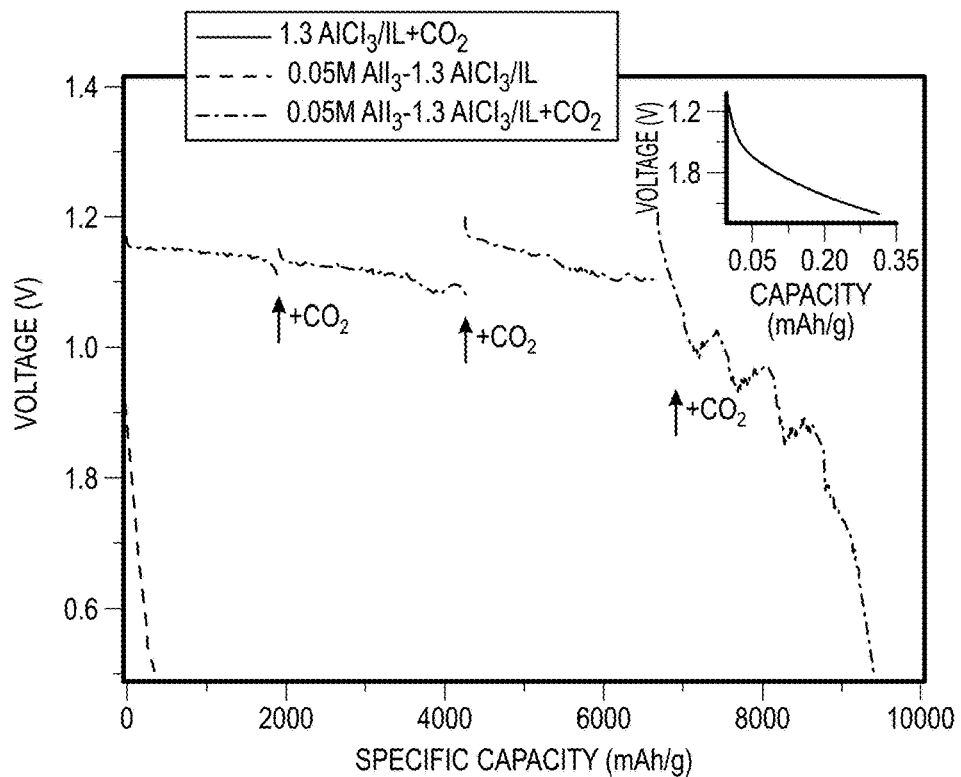
FIG. 2A is a plot of galvanostatic discharge profiles of the Al—$CO_2$ electrochemical cells of Example 1.

The electrochemical performance of the Al—$CO_2$ electrochemical cells/batteries with and without the $AlI_3$ additive are illustrated in FIG. 2A-2G. FIG. 2A is a plot of galvanostatic discharge profiles of the Al—$CO_2$ electrochemical cells. The inset of FIG. 2a illustrates the discharge of the comparative electrochemical cell without $CO_2$ or $AlI_3$ additive. As illustrated in the inset of FIG. 2A, no discharge plateau and a capacity of about 3.23 mAh/g (0.00204 mAh/cm²) was observed for the battery without either $AlI_3$ or $CO_2$. The electrochemical cell with only the $AlI_3$ additive also displayed no discharge plateau and a capacity of about 399.7 mAh/g (0.1770 mAh/cm²), while the electrochemical cell containing both $AlI_3$ and $CO_2$ displayed a discharge plateau at about 1.12 V and a capacity of about 9394 mAh/g (6.526 mAh/cm²).

Figure 2B:
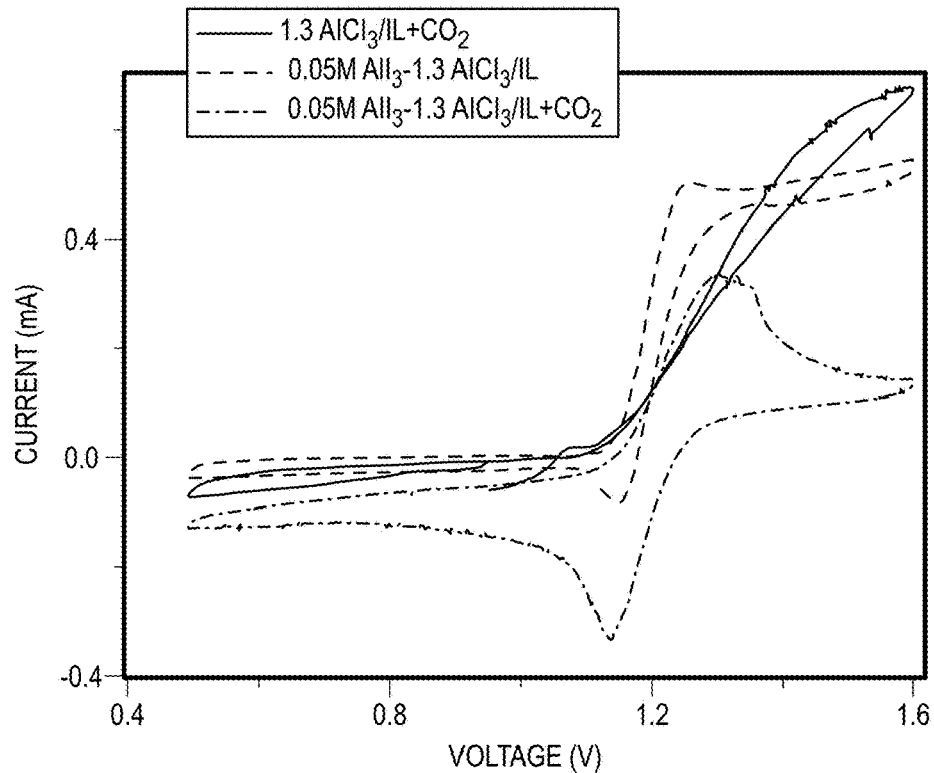
FIG. 2B is a cyclic voltammetry profile of the Al—$CO_2$ electrochemical cells of Example 1 at a scan rate of 0.1 mV/s from 0.5 to 1.6 V.

FIG. 2B is a cyclic voltammetry profile of the Al—$CO_2$ electrochemical cells at a scan rate of 0.1 mV/s from 0.5 to 1.6 V. As noted above and indicated in FIG. 2B, the electrochemical cells were prepared either with about 0.05 M $AlI_3$ additive or without the $AlI_3$ additive and were operated either in a $CO_2$ environment or in an argon environment without $CO_2$. It should be appreciated that the galvanostatic discharge of the battery with $AlI_3$ and $CO_2$ was intermittently paused to add more $CO_2$ to the battery. As illustrated in FIG. 2B, the Al—$CO_2$ battery containing both $AlI_3$ and $CO_2$ displayed a significant reduction peak at about 1.15 V, further indicating that the $AlI_3$ additive promoted $CO_2$ reduction during the discharge. The observed reduction peak of this battery at about 1.15 V closely matches the observed discharge plateau voltage observed under galvanostatic cycling (See FIG. 2a). As further illustrated in FIG. 2B, the cyclic voltammogram of the battery with $AlI_3$ in argon gas displayed a sharpened oxidation peak, indicating that a reactive iodine redox species can be formed electrochemically. The cyclic voltammogram of the battery with $CO_2$ and without $AlI_3$ showed an irreversible reaction of the $CO_2$.

Figure 2C:
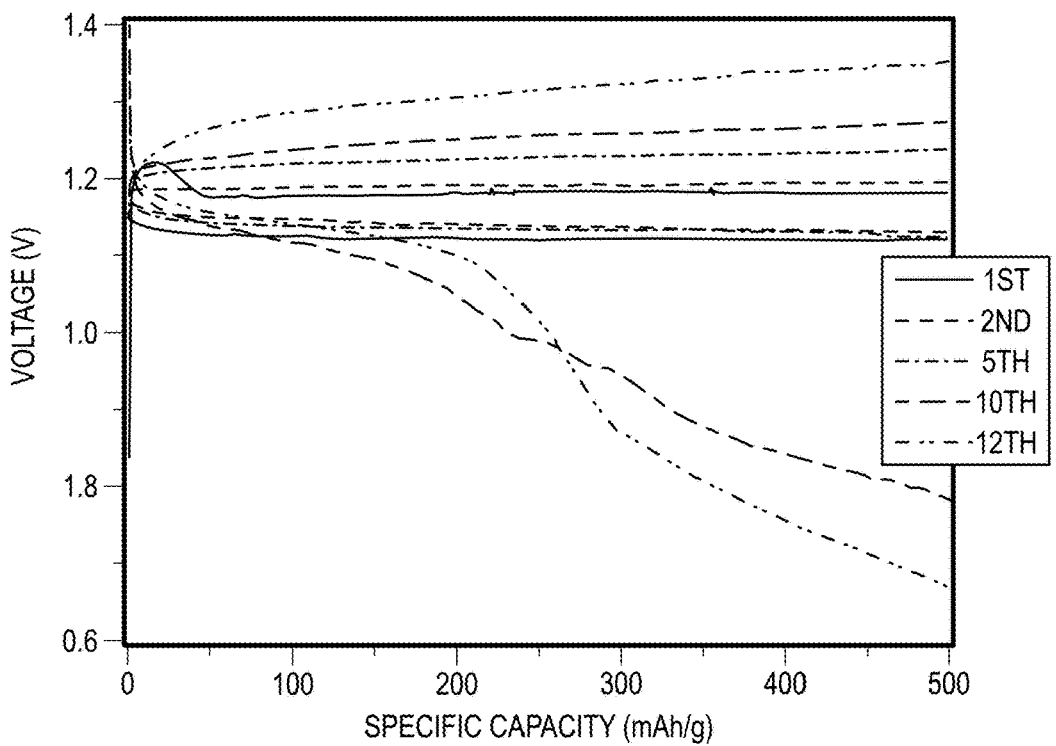
FIG. 2C is a plot of the first 12 galvanostatic cycles of the Al—$CO_2$ electrochemical cell of Example 1 containing 0.05 M $AlI_3$ at a cycling rate of 20 mA/g.

FIG. 2C is a plot of the first 12 galvanostatic cycles of the Al—$CO_2$ electrochemical cell of Example 1 containing 0.05 M $AlI_3$ at a cycling rate of 20 mA/g. The electrochemical cell was charged/discharged to a fixed capacity of 500 about mAh/g. As illustrated in FIG. 2C, over the course of cycling with an assigned capacity of about 500 mAh/g, the Al—$CO_2$ battery with the $AlI_3$ additive displayed a discharge voltage plateau at about 1.13 V and a charge voltage plateau at about 1.17 V. The first-cycle overpotential was only about 0.05 V and then increases to about 0.1 V after 10 cycles. As further illustrated in FIG. 2C, the relatively small voltage hump initially appearing in the first charge was likely due to the diffusion of the $CO_2$ and the electrolyte through the nanostructured cathode. It should be appreciated that conventional Li-$CO_2$ batteries with a heterogeneous catalyst (such as ruthenium or manganese oxide) typically exhibit an over-potential of about 1 V. Accordingly, in comparison to those commonly used heterogeneous catalysts, the $AlI_3$ additive exhibited a significant, surprising, and unexpected capability in reducing the overpotential in the Al—$CO_2$ batteries. The oxidation of solvated I⁻ appeared to be the initial step of the charge process, as direct decomposition of a solid and insulating discharge product would require a much higher overpotential.

Figure 2D:
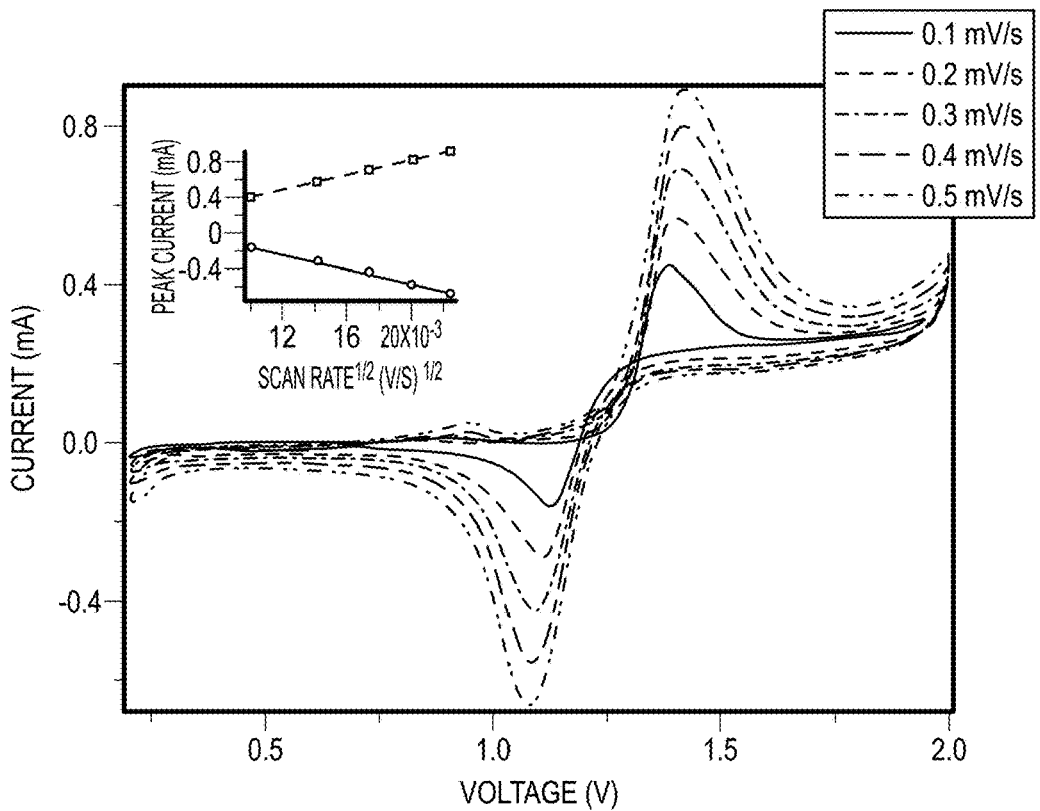
FIG. 2D is a cyclic voltammetry profile of the Al—$CO_2$ electrochemical cell of Example 1 containing 0.05 M $AlI_3$ from 0.5 to 1.6 V at varying scan rates.

FIG. 2D is a cyclic voltammetry profile of the Al—$CO_2$ electrochemical cell of Example 1 containing 0.05 M $AlI_3$ from 0.5 to 1.6 V at varying scan rates. The inset of FIG. 2D illustrates the relationship between the square root of scan rates and peak currents for the oxidation and reduction reactions.

Figure 2E:
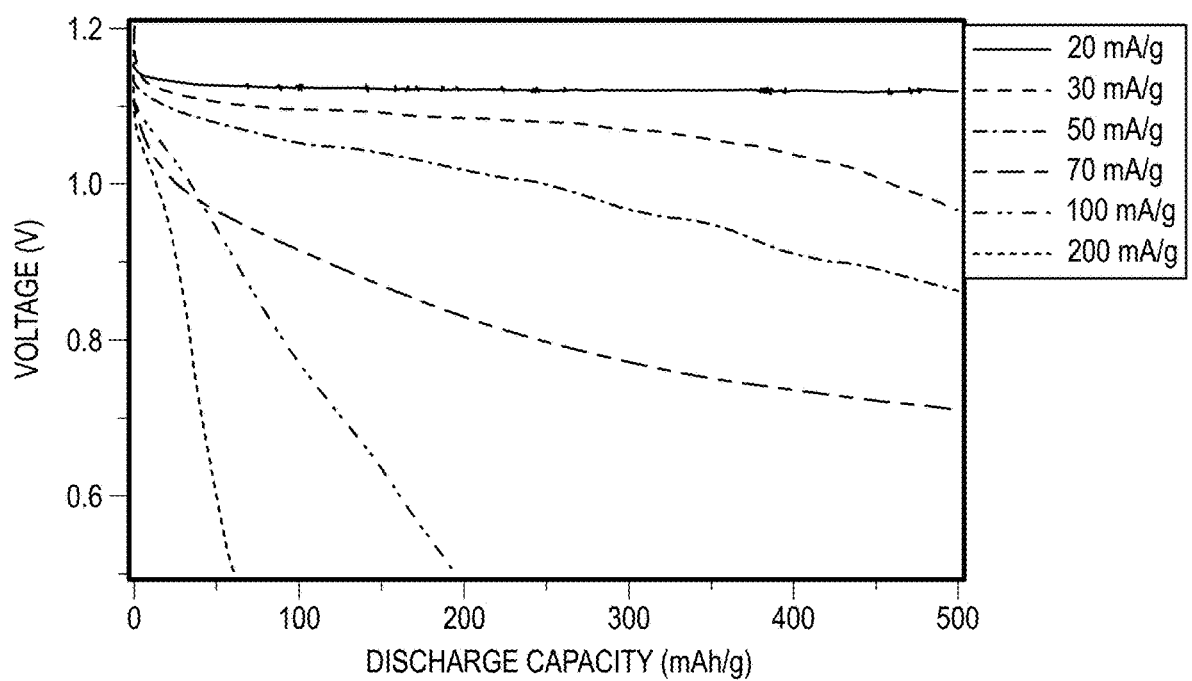
FIG. 2E is a plot of the galvanostatic discharge profiles of the Al—$CO_2$ electrochemical cell of Example 1 with 0.05M $AlI_3$ at varying current rates to a fixed capacity of 500 mAh/g.

As illustrated in FIG. 2D, the reversibility of the $AlI_3$-mediated Al—$CO_2$ batteries was further investigated by plotting redox peak currents as a function of the square root of scan rates. A completely reversible reaction was supposed to follow the Randles-Sevcik equation, in which the peak currents in the cyclic voltammogram (CV) were proportional to the square root of scan rates. The Al—$CO_2$ battery in this study closely followed this relation (FIG. 2D, inset), which indicates that the oxidation charge process was the reverse of the reduction discharge reaction. A small peak at about 0.95 V due to decomposition of impurities in the electrolyte can be seen in the highest scan rate sample. As illustrated in FIG. 2E, the reduction reaction of the cell was highly sensitive to the current rate applied, and sustained a discharge plateau to a discharge rate of about 70 mA/g (FIG. 2E). This sensitivity has been observed previously and may be attributed to the slow kinetics of the multielectron discharge reaction mechanism of Al.

Figure 2F:
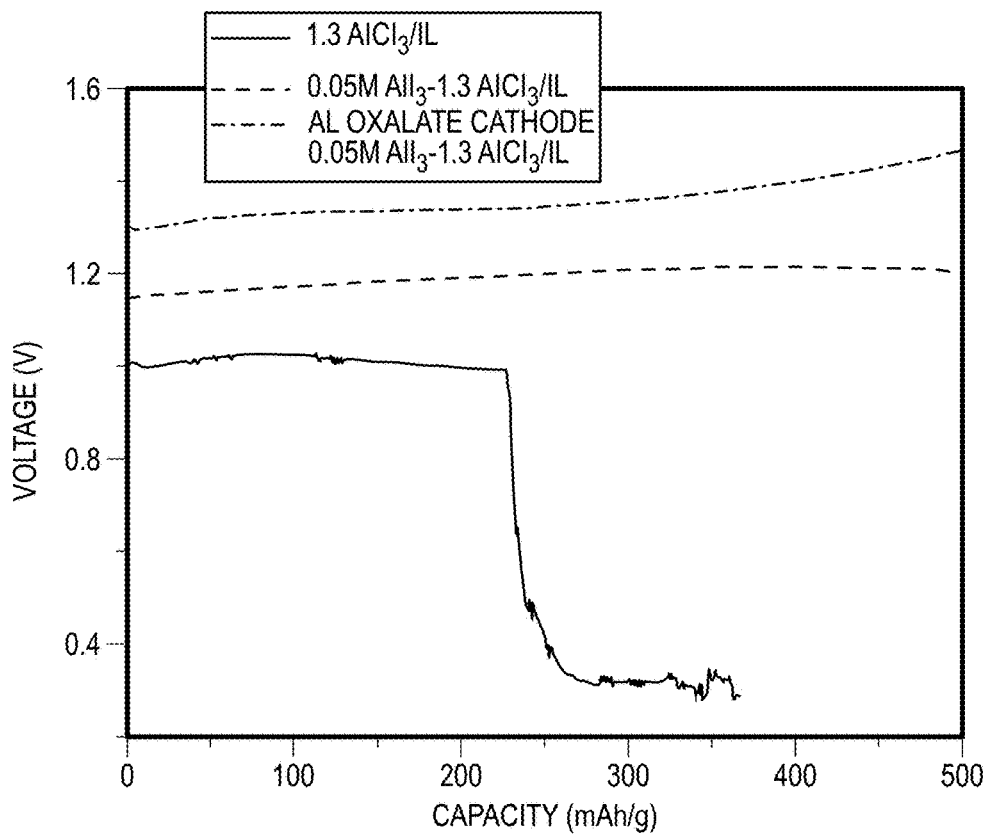
FIG. 2F illustrates galvanostatic charge tests of Al—$CO_2$ electrochemical cells of Example 1 with and without the $AlI_3$ additive, as well as an electrochemical cell with the $AlI_3$ additive and a cathode prefilled with aluminum oxalate.

To further support the rechargeability of the Al—$CO_2$ battery, electrochemical cells having cathodes fabricated with added aluminum oxalate ($Al_2(C_2O_4)_3$) in a ratio of about 1:1 to Ketjen black were prepared. The cathode containing aluminum oxalate had an equal carbon and aluminum oxalate loading of about 0.66 mg. Cathodes containing aluminum oxalate were fabricated in an argon-filled glove box with $O_2$ and $H_2O$ levels below 1.0 ppm. The battery slurry was prepared based on the procedures mentioned above. Aluminum oxalate was baked at about 300° C. in the glove box before addition at equal mass to the carbon. About 4x NMP was added to the slurry before dip casting the carbon paper. Cathodes were vacuum dried at about 80° C. for about 8 hours before use. FIG. 2F illustrates the results of the galvanostatic charge tests of Al—$CO_2$ electrochemical cells with and without the $AlI_3$ additive, as well as an electrochemical cell with the $AlI_3$ additive and a cathode prefilled with aluminum oxalate. All tests were conducted in an argon atmosphere with a current rate of about 20 mA/g. As illustrated in FIG. 2F, the galvanostatic charge profile of the battery with added aluminum oxalate showed a heightened charge plateau from about 1.18 to about 1.3 V, which closely matched the cyclic voltammetry reduction and oxidation peak potentials (See FIG. 2B).

Figure 2G:
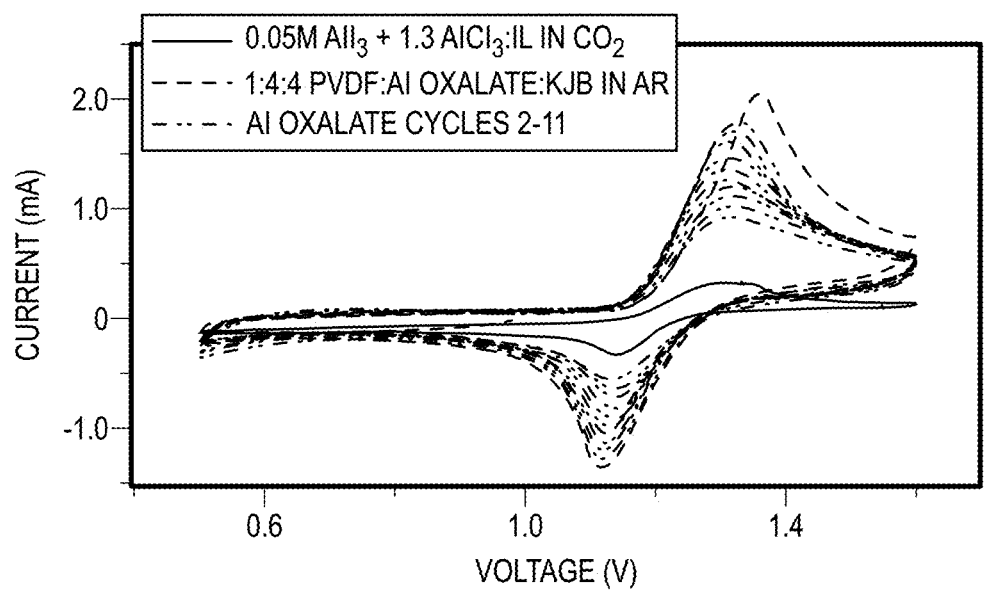
FIG. 2G illustrates cyclic voltammetry profiles comparing the electrochemical cells with 0.05M $AlI_3$ in $CO_2$ to the electrochemical cells constructed with a cathode containing aluminum oxalate and an electrolyte containing 0.05M $AlI_3$ in argon.

FIG. 2G illustrates cyclic voltammetry profiles comparing the electrochemical cells with 0.05M $AlI_3$ in $CO_2$ to the electrochemical cells constructed with a cathode containing aluminum oxalate and an electrolyte containing 0.05M $AlI_3$ in argon. The dramatic alteration of the peak position and shape from the battery containing 0.05M $AlI_3$ in argon without aluminum oxalate shows that the additive is electrochemically active. The close match between the peak positions of the two electrochemical cells/batteries shown indicates that aluminum oxalate is formed and decomposed in both systems. Particularly, the CV of the Al—$Al_2(C_2O_4)_3$ battery with about 0.05 M $AlI_3$ showed that after a high overpotential during the first charge cycle, the reduction and oxidation peak positions near exactly match that of an Al—$CO_2$ battery with 0.05 M $AlI_3$. Accordingly, the data supports or demonstrates that the charge reaction is the decomposition of aluminum oxalate. The battery cycling for 12 cycles during galvanostatic cycling suggests that the decomposition of aluminum oxalate may not be complete (See FIG. 2C).

Example 2

As indicated in FIG. 2B, an increase in open-circuit potential of the Al—$CO_2$ batteries by about 0.05 V was observed when using the electrolyte with added $AlI_3$. To examine the effect of $AlI_3$ on the Al anode, symmetric Al/Al cells with and without the $AlI_3$ additive were fabricated, and electrochemical impedance as well as stripping/platting studies across a variety of current rates were performed. FIGS. 3A-3H illustrate the effects/results of the aluminum iodide additive on the electrochemical and microscopic characterization of the aluminum anode.

Figure 3A:
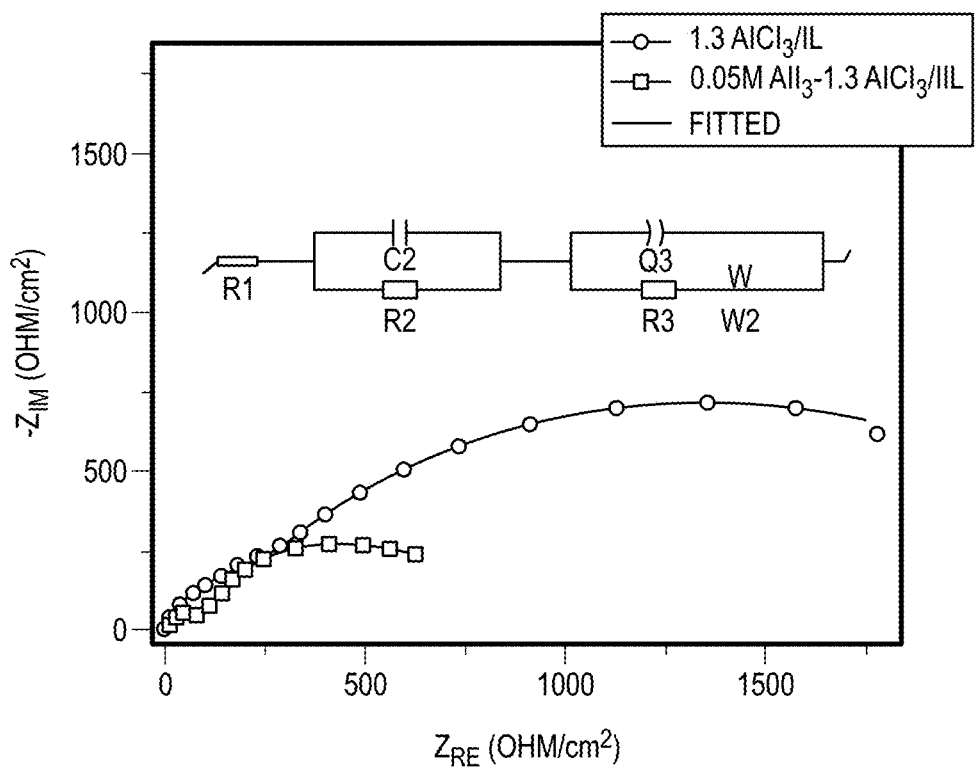
FIG. 3A illustrates the electrochemical impedance spectroscopy of pristine symmetric Al/Al cells with and without $AlI_3$.

FIG. 3A illustrates the electrochemical impedance spectroscopy of pristine symmetric Al/Al cells with and without $AlI_3$. As illustrated in FIG. 3A, the impedance analysis of the batteries showed that the bulk resistance was similar between the batteries with and without $AlI_3$, but the interfacial resistance was significantly reduced for the cell with $AlI_3$ additive.

Figure 3B:
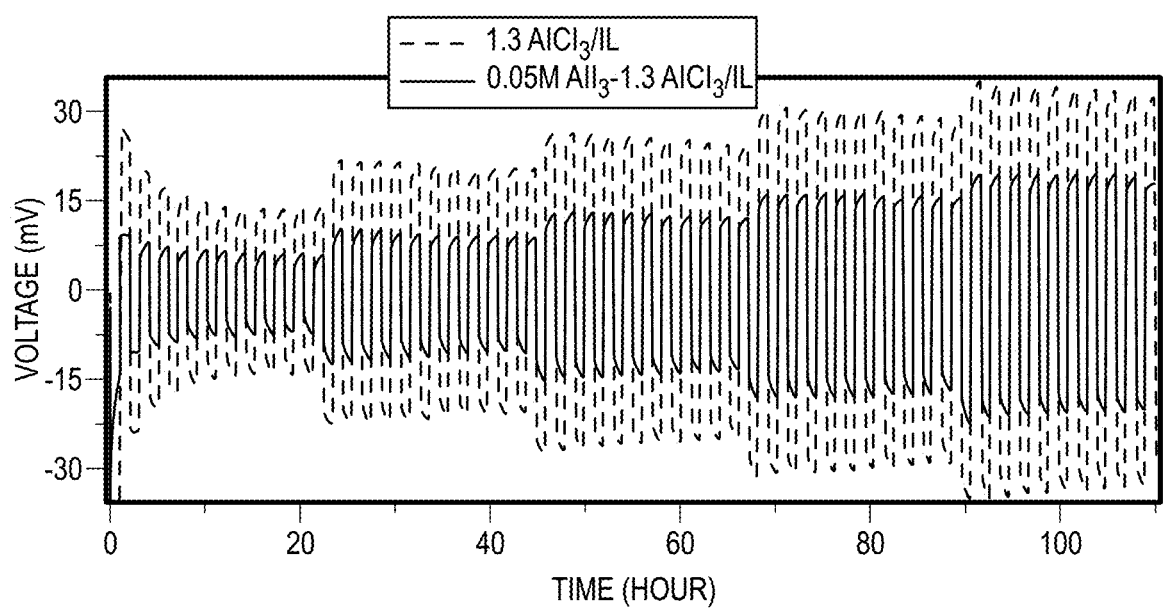
FIG. 3B illustrates a stripping/plating test of symmetric Al/Al cells with and without the $AlI_3$ additive at current rates of about 0.2, about 0.3, about 0.4, about 0.5, and about 1 mA/$cm^2$.
Figure 3F:
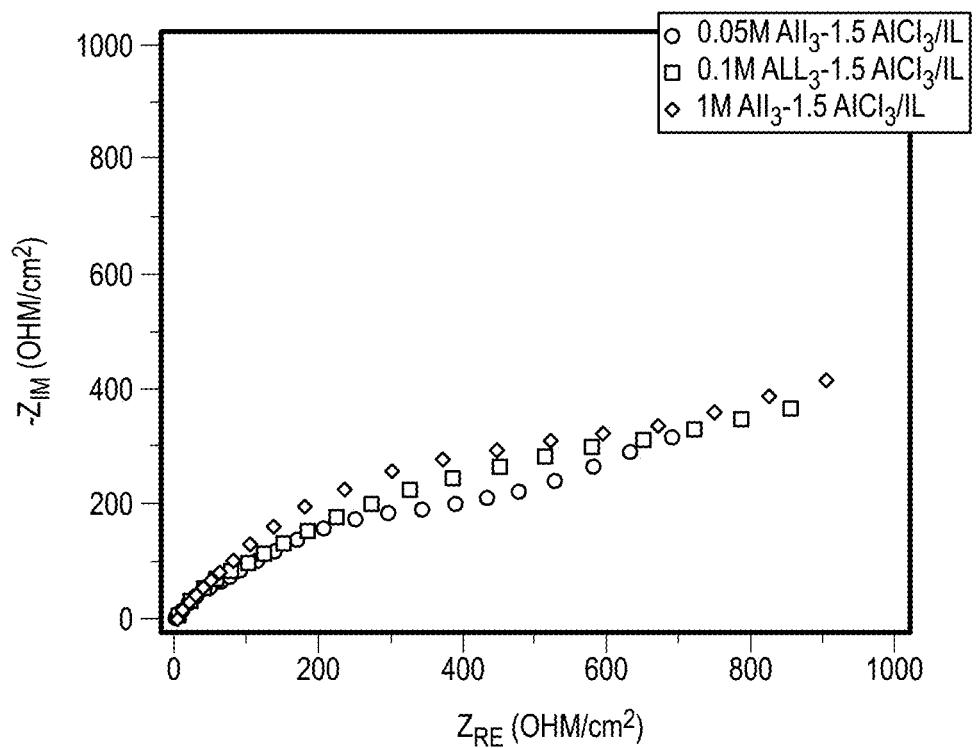
FIG. 3F illustrates the electrochemical impedance spectroscopy of Al/Al symmetric cells with increased $AlI_3$ concentration.
Figure 3G:
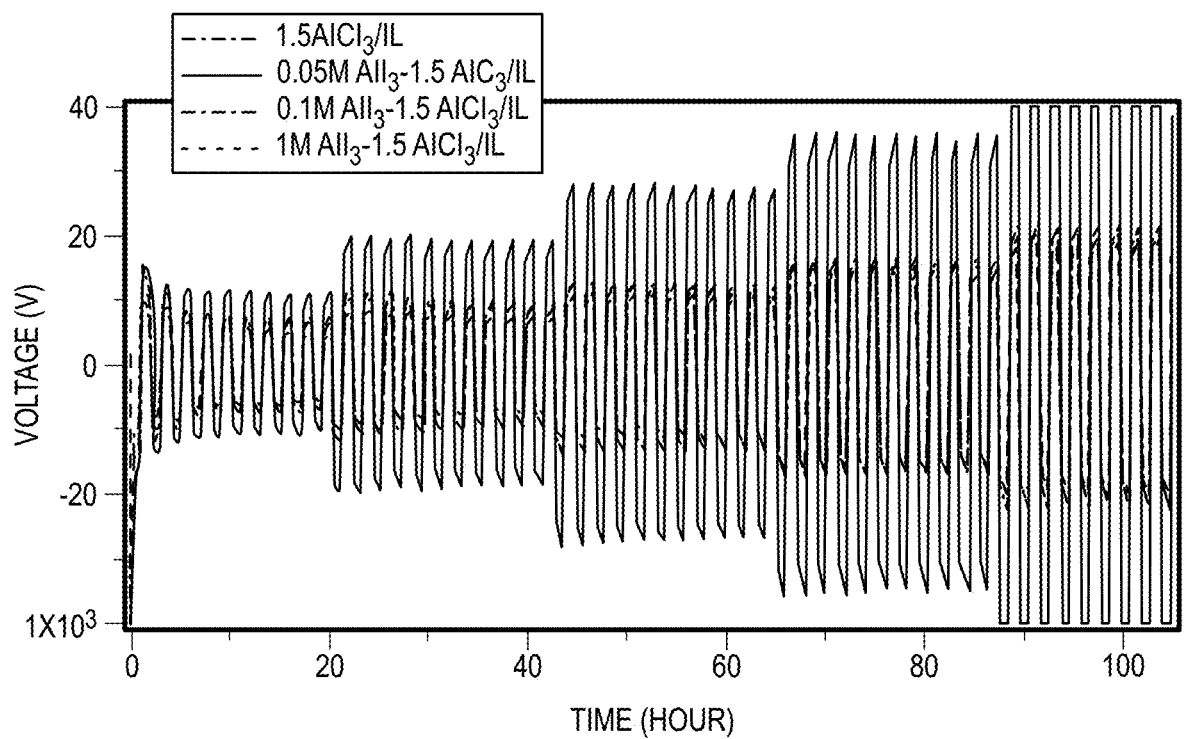
FIG. 3G illustrates a stripping/plating test of Al/Al symmetric cells with increased $AlI_3$ concentration performed at a current rate of about 0.2 mA/$cm^2$ with a cycle time of about 1 hour per charge or discharge.

As illustrated in FIGS. 3F and 3G, doubling the $AlI_3$ additive concentration to about 0.1 M showed little effect on either stripping/plating overpotential or interfacial resistance, while further increasing the concentration of additive to about 1.0 M negatively affected the cell performance. Without being bound by theory, it is believed that this observation may be due to the decrease in the ionic conductivity of the electrolyte.

FIG. 3B illustrates a stripping/plating test of symmetric Al/Al cells with and without the $AlI_3$ additive at current rates of about 0.2, about 0.3, about 0.4, about 0.5, and about 1 $mA/cm^2$. The cells were intermittently charged/discharged for 1 h in each cycle. The cell containing $AlI_3$ displayed a lower stripping/plating overpotential during galvanostatic cycling, with the greatest reduction in overpotential of about 52.8% at the lowest current rate of about 0.2 $mA/cm^2$.

FIG. 3C illustrates electrochemical impedance spectroscopy of symmetric Al/Al cells with and without $AlI_3$ after about 100 hours (h) of stripping/plating at a current rate of about 0.2 $mA/cm^2$. The impedance analysis showed that the cell with $AlI_3$ additive maintained a lower interfacial resistance than the cell without the additive after cycling for about 100 h at about 0.2 $mA/cm^2$.

Figure 3H:
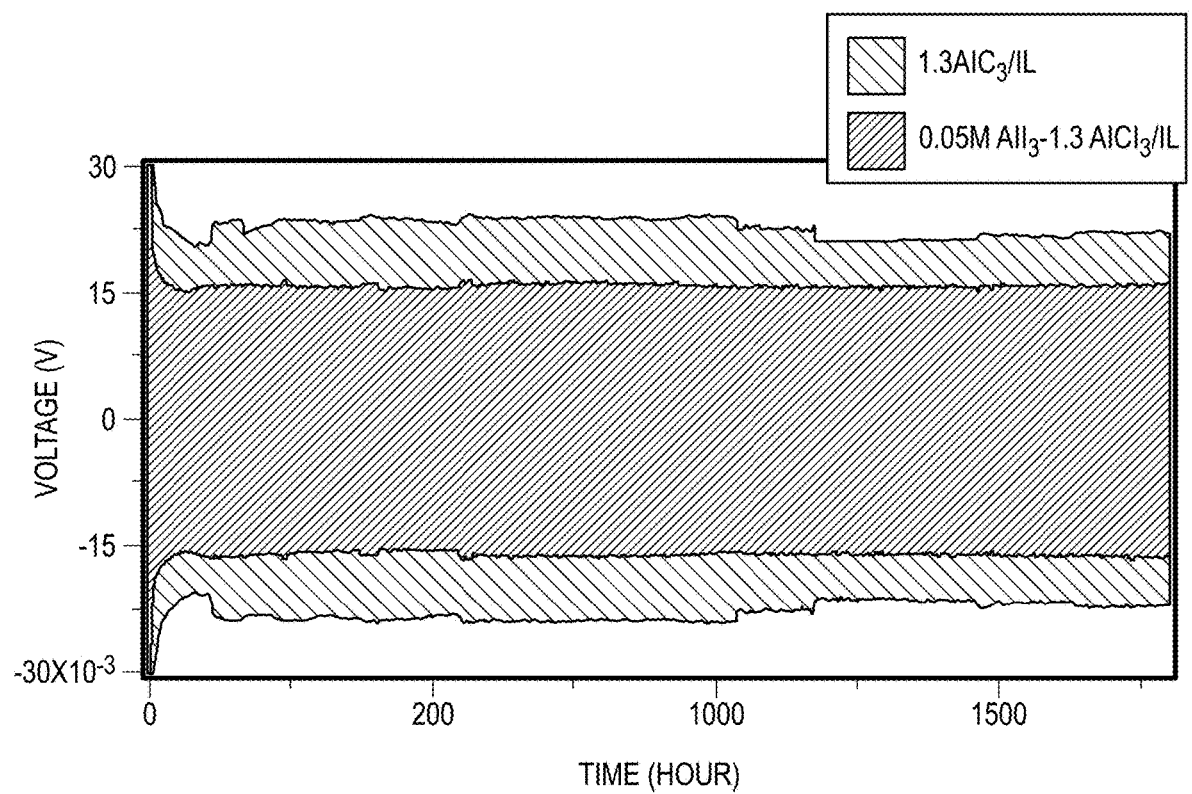
FIG. 3H illustrates long-term stripping/plating data of symmetric cells with and without $AlI_3$ at a current rate of 0.2 mA/$cm^2$.

FIGS. 3D and 3E illustrate scanning electron microscopy (SEM) images of aluminum anodes from Al/Al cells without and with the $AlI_3$ additive, respectively, after about 1000 h of stripping/plating at a current rate of 0.2 $mA/cm^2$. The SEM images of the respective anodes of the electrochemical cells after cycling for about 1,000 h at about 0.2 $mA/cm^2$ showed that cells with the $AlI_3$ additive exhibited relatively larger feature sizes. The relatively larger feature sizes showed that adding $AlI_3$ facilitates smoother (homogeneous) aluminum deposition, which should also reduce parasitic reactions with the electrolyte. It is possible that the iodine-containing solid-electrolyte interphase resulted in a lower ion diffusion energy barrier, as has been previously calculated for sodium anodes. As illustrated in FIG. 3H, stripping/plating tests of symmetric cells with and without $AlI_3$ show that the additive reduced and stabilized the stripping/plating overpotential for over 1,700 h at a current rate of about 0.2 $mA/cm^2$.

Example 3

To examine the electrochemical mechanism of the Al—$CO_2$ battery, the batteries were disassembled in an inert atmosphere at different stages of charge and discharge. Batteries were disassembled for characterization only in an argon glove box with $O_2$ and $H_2O$ level below 1.0 ppm. Liquid phase samples were prepared for further characterization by rinsing the cathode in acetonitrile and collecting the resulting wash. The primary method used to identify the discharge product is aluminum-27 nuclear magnetic resonance ($^{27}Al$ NMR). The 100% natural abundance and high NMR activity of the $^{27}Al$ isotope make $^{27}Al$ NMR practical for investigating Al-based batteries. Additionally, $^{27}Al$ NMR has been previously used to identify the ion intercalation mechanism of the graphitic carbon nitride cathode in Al-ion batteries and the chloroaluminate speciation of novel molten salt electrolytes. NMR analysis was performed on a Bruker Nanobay 300 platform. To correct the aluminum signal, a proton scan was performed for each sample. The solvent proton signal (1H acetonitrile, 1.93 ppm) was corrected against the established value, and this correction was transferred to the aluminum spectrum. The $^{27}Al$ spectrum was collected at about 78.2 MHz using a 30° pulse at about 3 μs and a recycle delay of about 1 s. 32,000 data points were collected across 64 scans with a sweep width of 500 ppm.

It should be appreciated that other characterization methods were performed to study the reaction products. However, the ionic liquid electrolyte was observed to react spontaneously in air, which was confirmed by energydispersive spectroscopy. Additionally, attempts to remove the electrolyte from the cathode resulted in removal of the discharge product as well, which was confirmed via SEM microcopy of a discharged cathode before and after washing. In view of the foregoing, $^{27}$Al NMR was determined to be the ideal method to evaluate the reaction products, as no contact with air is required.

FIGS. 4A-4E illustrate the characterization and/or product identification for the AlI$_3$ mediated Al—CO$_2$ batteries.

Figure 4A:
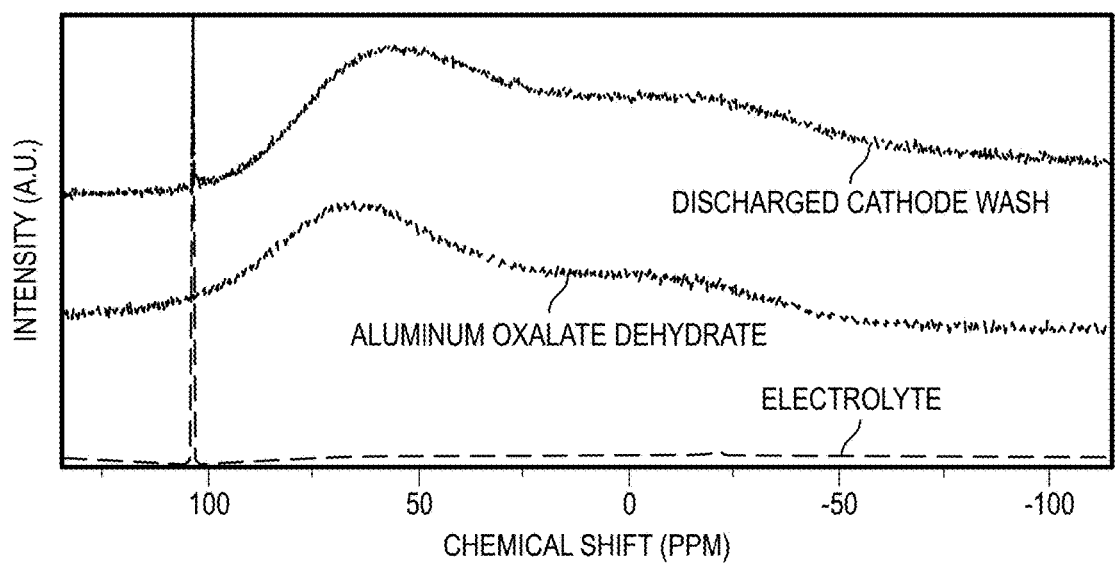
FIG. 4A illustrates the $^{27}Al$ NMR spectra (78.2 MHz) of an electrolyte containing about 0.05 M $AlI_3$ diluted in acetonitrile, a solution of saturated aluminum oxalate dehydrate in acetonitrile, and the collected acetonitrile used to wash the cathode of the Al—$CO_2$ batteries with $AlI_3$ after discharge.

FIG. 4A illustrates the $^{27}$Al NMR spectra (78.2 MHZ) of an electrolyte containing about 0.05 M AlI$_3$ diluted in acetonitrile, a solution of saturated aluminum oxalate dehydrate in acetonitrile, and the collected acetonitrile used to wash the cathode of the Al—CO$_2$ batteries with AlI$_3$ after discharge. As illustrated in FIG. 4A, the ionic liquid electrolyte spectrum displays a single sharp peak at about 103.8 ppm, which closely matched previous observations. The lack of a second, relatively smaller peak indicated that the added AlI$_3$ dissolved to form Al$^{3+}$ and I$^-$ species, instead of possibly forming AlI$_4^-$ like the known AlCl$_3$ speciation in ionic liquid. As illustrated in FIG. 4A, the electrolyte peak is clearly visible at about 103.8 ppm in the discharge sample. As further illustrated in FIG. 4A, the two broad peaks at about 56.2 and about -15.5 ppm in the discharged sample were identified to be aluminum oxalate by comparison to an aluminum oxalate standard. The broad peaks were characteristic of a poorly solvated species with significant electronic shielding. A relatively small shift in peak location was observed between the aluminum oxalate standard and the discharge product, which was attributed to the solvation effect of the electrolyte.

Thermogravimetric analysis (TGA) was implemented to identify the discharge product as well, which further supported the results obtained from NMR. TGA analysis was performed on a TGA5500 (TA Instruments). Samples were run under nitrogen with a flow rate of about 25 ml/min and a temperature ramp rate of about 5° C./min. Samples were scaled in 20 ml scintillation vials with parafilm before being transferred from the glove box to the TGA. The samples were loaded into ceramic crucibles placed on platinum pans. The air exposure time was less than 2 minutes during the processes of transferring the samples from sealed containers to the TGA holders and being placed in a nitrogen atmosphere. The results are show in in FIG. 4B, which illustrates TGA of the cathode of the Al—CO$_2$ battery with AlI$_3$ after discharge, compared against an aluminum oxalate standard, a cathode wetted with the electrolyte, and a cathode from the same battery configuration after charge.

Figure 4B:
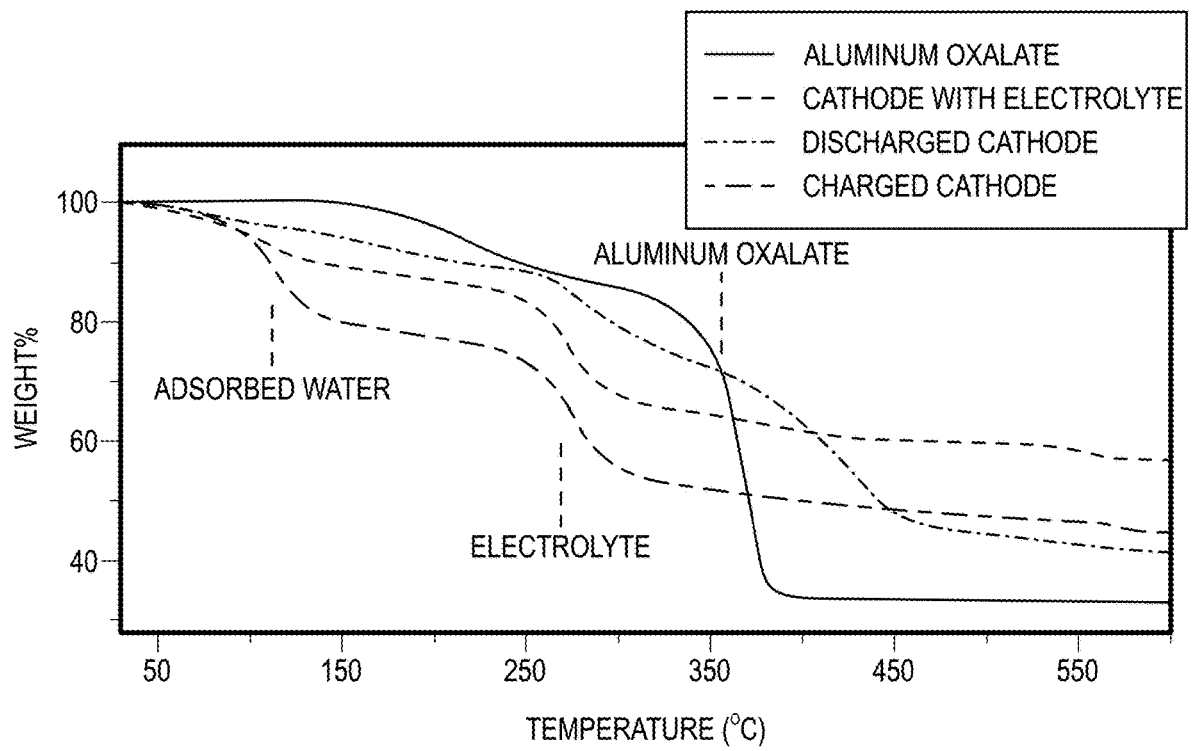
FIG. 4B illustrates thermogravimetric analysis (TGA) of the cathode of the Al—$CO_2$ battery with $AlI_3$ after discharge, compared against an aluminum oxalate standard, a cathode wetted with the electrolyte, and a cathode from the same battery configuration after charge.
Figure 4C:
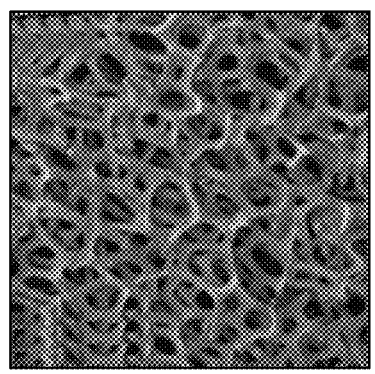
FIG. 4C illustrates SEM images of pristine nickel foam cathode insets.

As shown in FIG. 4B, aluminum oxalate decomposed under nitrogen near about 350° C. Samples also showed mass loss near about 100° C. from adsorbed water, and the electrolyte decomposition at about 260° C. provided another mass loss peak to the samples with the electrolyte. The cathode of a battery with the AlI$_3$ additive discharged under CO$_2$ also showed a significant mass loss near about 350° C. due to the decomposition of aluminum oxalate. The observed decomposition temperature was above the decomposition temperature observed by Sadat et al. cited above. Without being bound by theory, it is believed that the foregoing was at least partially attributed to the difference in sample preparation. Particularly, it was observed the aluminum oxalate was at least partially soluble in acetonitrile; thus, samples were not washed prior to TGA measurements, which caused an additional mass loss peak near about 250° C. due to electrolyte decomposition and an extended aluminum oxalate decomposition due to a larger particle size.

Figure 4D:
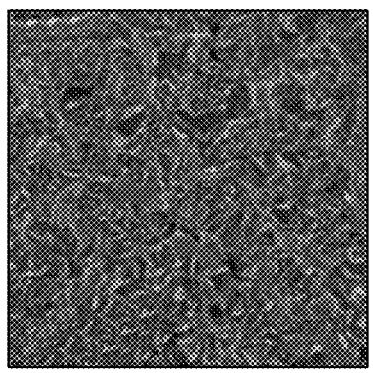
FIG. 4D illustrates SEM images of nickel foam cathode insets from $AlI_3$-mediated Al—$CO_2$ batteries after discharge.
Figure 4E:
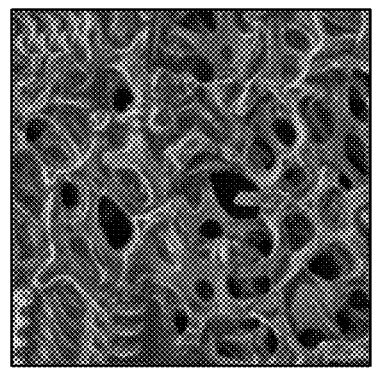
FIG. 4E illustrates SEM images of nickel foam cathode insets from $AlI_3$-mediated Al—$CO_2$ batteries after charge.

Batteries with nickel foam insets between the cathode and separator were used to image the discharge product formation and degradation with SEM. The results are illustrated in FIGS. 4C-4G. A thick layer of discharge product formed on the cathode after discharge, as shown in FIG. 4D. After charge, the discharge product was almost completely removed, as show in in FIG. 4E. Comparison with SEM images of a nickel foam inset wetted with electrolyte revealed that only a thin layer of material remained on the charged cathode that was identified to be the electrolyte. The foregoing strongly suggests that the discharge product was forming and decomposing during battery discharge and charge, which supports the reversibility of the Al—CO$_2$ battery.

Figure 5:
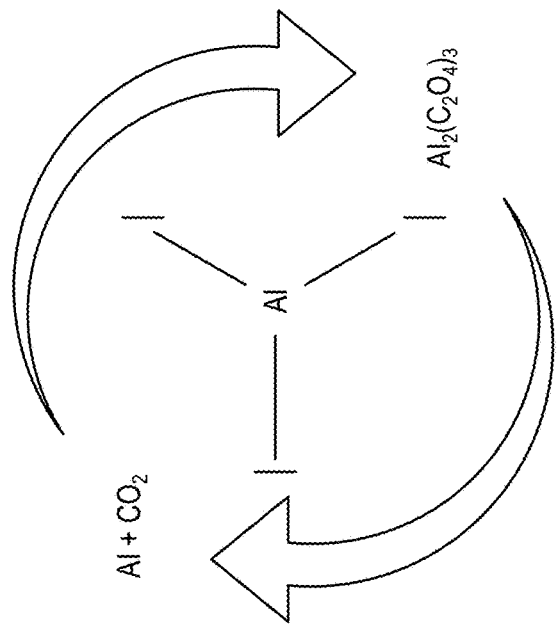
FIG. 5 illustrates a scheme or cycle of the reactive species, according to one or more implementations disclosed herein.
Figure 5:
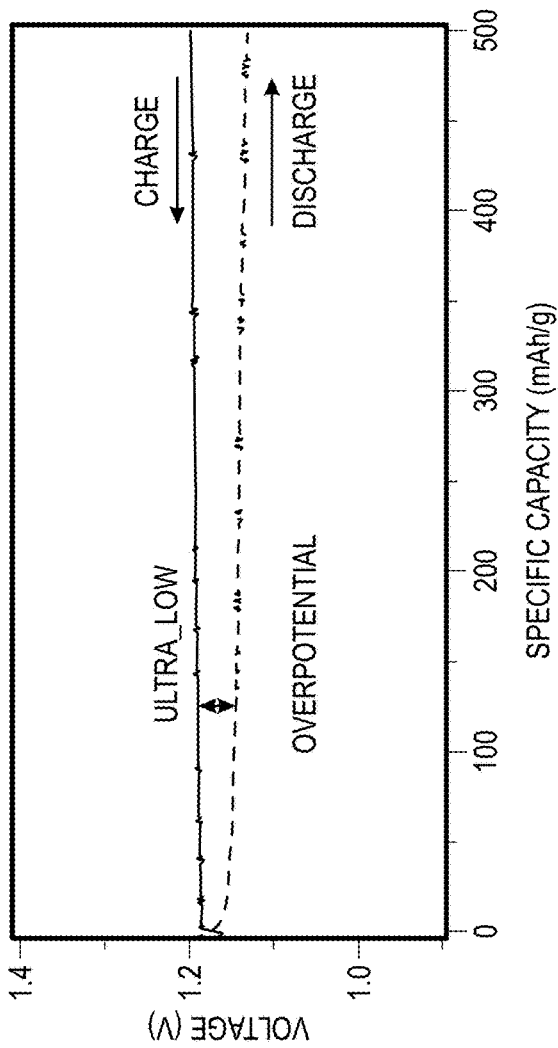

It should be appreciated that the present inventors have demonstrated that the introduction of AlI$_3$ to the battery clearly enables the discharge of the Al—CO$_2$ battery as a replacement for O$_2$ in the previous primary Al—CO$_2$/O$_2$ battery. However, unlike O$_2$, the AlI$_3$ also enables the reversibility of Al—CO$_2$ batteries. Without being bound by theory, it is believed that the charge mechanism could possibly follow previously identified schemes using iodine as a homogeneous redox mediator, in which the solvated iodine species (usually identified to be I$^-$, in some cases I$_2$) is oxidized to form the reactive species I$_3^-$ (See FIG. 5). These reactive species may then decompose the discharge product chemically, thereby regenerating the initial species. FIG. 5 illustrate a scheme or cycle of the reactive species. Accordingly, iodine has been demonstrated to be a viable replacement for oxygen as a redox mediator during discharge. It should be appreciated that direct reduction of CO$_2$ in the absence of an additive was not observed.

It should be appreciated that the inventors have developed and demonstrated a rechargeable Al—CO$_2$ battery enabled by a homogeneous redox mediator, AlI$_3$, capable of storing energy and concentrating carbon. While the conventional primary Al—CO$_2$/O$_2$ battery is projected to result in a net reduction of CO$_2$ emissions through carbon capture, a secondary configuration demonstrated herein presents a more powerful tool to reduce CO$_2$ emissions due to its capability of reversible carbon concentration during normal operation before the end-of-life carbon capture.

Example 4

Figure 6A:
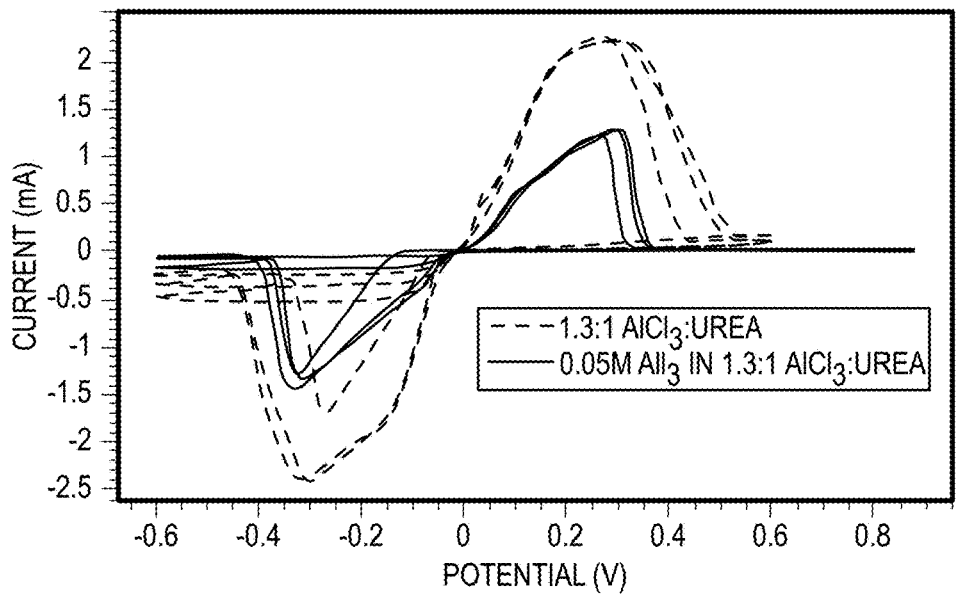
FIG. 6A a cyclic voltammetry profile of the Al—$CO_2$ electrochemical cells of Example 4 at a scan rate of 0.1 mV/s from −0.6 to 0.6 V.
Figure 6B:
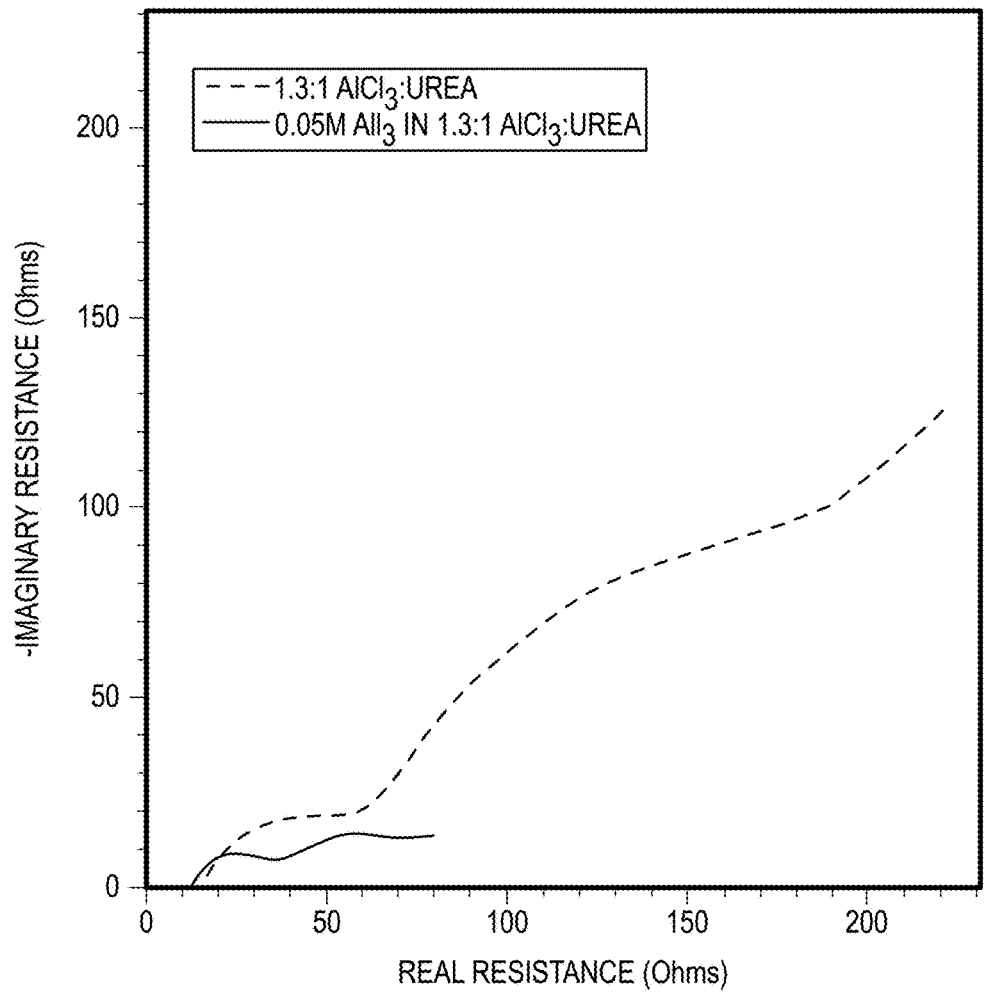
FIG. 6B is a potentiostatic impedance plot of the Al—$CO_2$ electrochemical cells of example 4 from 100 MHz to 200 kHz.

Electrochemical cells were fabricated similar to the procedure discussed in Example 1, however, the electrolyte was prepared by combining AlCl$_3$ and urea in a molar ratio of about 1.3:1. The electrochemical cells were evaluated with and without AlI$_3$. Cyclic voltammetry scans of the electrolyte with AlI$_3$ display an earlier increase in stripping/plating current. Potentiostatic electrochemical impedance scans of the electrolyte with AlI$_3$ display significantly reduced anodic and cathodic interfacial resistance. The results are illustrated in FIGS. 6A and 6B.

Example 5

Figure 7A:
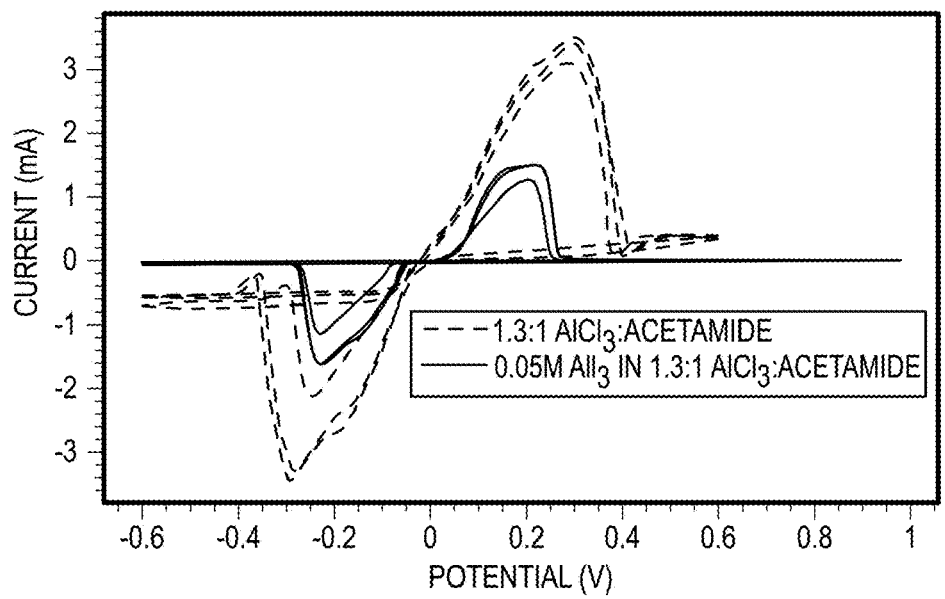
FIG. 7A a cyclic voltammetry profile of the Al—$CO_2$ electrochemical cells of Example 5 at a scan rate of 0.1 mV/s from −0.6 to 0.6 V.
Figure 7B:
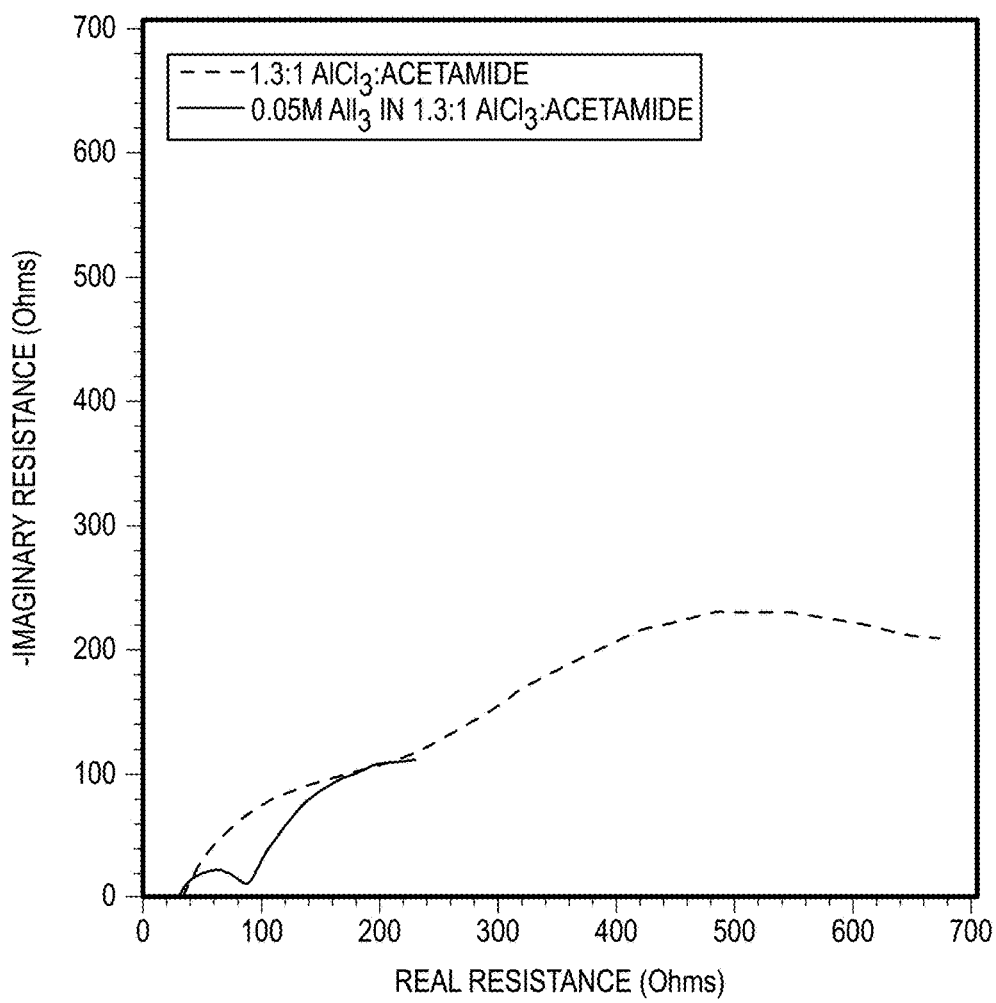
FIG. 7B illustrates a potentiostatic impedance plot of the Al—$CO_2$ electrochemical cells of example 4 from 100 MHz to 200 kHz.

Electrochemical cells were fabricated similar to the procedure discussed in Example 1, however, the electrolyte was prepared by combining AlCl$_3$ and urea in a molar ratio of about 1.3:1. The electrochemical cells were evaluated with and without AlI$_3$. Cyclic voltammetry scans of the electrolyte with AlI$_3$ display an earlier increase in stripping/plating current. Potentiostatic electrochemical impedance scans of the electrolyte with AlI$_3$ display significantly reduced anodic and cathodic interfacial resistance. The results are illustrated in FIGS. 7A and 7B.

It should be appreciated, based on the results illustrated in FIGS. 6A, 6B, 7A, and 7B, that the respective electrochemical cells exhibit enhanced aluminum stripping and plating. The results of the above figures show that aluminum stripping and plating overpotentials are decreased by the addition of aluminum iodide to the electrolyte. Without being bound by theory, it is believed that that the iodine is performing in another role in the electrolyte that enhances aluminum stripping and plating. The aluminum iodide may change the interphase between the liquid electrolyte and the solid electrode to facilitate improved aluminum ion transport across the boundary. The aluminum iodide may also engage aluminum ion stripping/plating directly.

The present inventors have surprisingly and unexpectedly discovered that utilizing an electrolyte comprising a deep eutectic mixture of urea or acetamide and aluminum chloride, with an electrolyte additive, such as aluminum iodide, resulted in a significant and unexpected capability in efficiently stripping/plating aluminum metal.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. An electrochemical device, comprising:
   an anode;
   a cathode comprising aluminum oxalate; and
   an electrolyte disposed between the anode and the cathode, the electrolyte comprising a deep eutectic mixture and an electrolyte additive,
   wherein the deep eutectic mixture comprises an ion coordinated complex prepared from a combination of aluminum chloride (AlCl$_3$) and an amide; and
   wherein the amide of the ion coordinated complex comprises one or more of thiourea, formamide, dimethylformamide, dimethylacetamide, or a combination thereof.

2. The electrochemical device of claim 1, wherein the amide further comprises urea or acetamide.

3. The electrochemical device of claim 1, wherein the aluminum chloride and the amide are present in a molar ratio of from about 1:1 to about 1.5:1.

4. The electrochemical device of claim 1, wherein the electrolyte further comprises an organic solvent configured to reduce a viscosity of the electrolyte, wherein a volume ratio of the deep eutectic mixture to the organic solvent is from about 1:4 to about 4:1.

5. The electrochemical device of claim 4, wherein the organic solvent comprises one or more of acetonitrile, dichloromethane, chloroform, tetraethyl dimethyl ether, propylene carbonate, ethylene carbonate, fluoroethylene carbonate, or a combination thereof.

6. The electrochemical device of claim 1, wherein the electrolyte additive comprises one or more of iodine, an iodine salt, an iodide salt, an organic iodide species, an organic radical, or a combination thereof.

7. The electrochemical device of claim 6, wherein the electrolyte additive comprises aluminum iodide (AlI$_3$).

8. The electrochemical device of claim 1, wherein the electrolyte additive is present in the electrolyte in an amount of from about 0.01 M to about 0.1 M.

9. The electrochemical device of claim 1, further comprising a housing, wherein the anode, the cathode, and the electrolyte are disposed in the housing.

10. The electrochemical device of claim 9, wherein the housing comprises one or more ports configured to provide inlet and outlet of a gas.

11. The electrochemical device of claim 1, wherein the cathode comprises a carbon material, and wherein the anode comprises a metal.

12. The electrochemical device of claim 11, wherein the metal comprises one or more of sodium, magnesium, aluminum, zinc, calcium, copper, iron, or a combination thereof.

13. The electrochemical device of claim 11, wherein the carbon material comprises one or more of graphene, graphite, carbon black, carbon fibers, carbon microfibers, carbon nanomaterials, carbon nanotubes, multi-walled carbon nanotubes, single walled carbon nanotubes, biotemplated carbon materials, molecular templated multi-walled carbon nanotubes, biotemplated single walled carbon nanotubes, or a combination thereof.

14. The electrochemical device of claim 1, wherein the cathode is in direct contact with the environment and configured to allow diffusion of carbon dioxide to the electrolyte.

15. The electrochemical device of claim 11, wherein the carbon material is porous and configured to allow diffusion of carbon dioxide to the electrolyte.

16. The electrochemical device of claim 1, wherein the electrochemical device comprises a capacity of greater than 9600 mAh/g$_{carbon}$, an energy density of greater than 7700 mWh/g$_{carbon}$, or a combination thereof.

17. A method for sequestering carbon dioxide with the electrochemical device of claim 1, the method comprising:
   discharging the electrochemical device in the presence of carbon dioxide; and
   converting the carbon dioxide to a reduced carbon dioxide material.

18. A method for capturing carbon dioxide with the electrochemical device of claim 1, the method comprising:
   discharging the electrochemical device in the presence of carbon dioxide;
   delivering an electrolyte comprising aluminum to the electrochemical device;
   flowing the electrolyte to and through the electrochemical device via an electrolyte entry port;
   converting the carbon dioxide to a reduced carbon dioxide material; and
   directing the reduced carbon dioxide material out of the electrochemical device.

* * * * *